(12) United States Patent
Ho et al.

(10) Patent No.: US 9,480,014 B2
(45) Date of Patent: Oct. 25, 2016

(54) DEVICE CONFIGURATION IN A HYBRID COMMUNICATION NETWORK

(71) Applicant: QUALCOMM Incorporated, San Diego, CA (US)

(72) Inventors: Sai Yiu Duncan Ho, San Diego, CA (US); Bibhu Prasad Mohanty, San Diego, CA (US); Etan Gur Cohen, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 13/905,971

(22) Filed: May 30, 2013

(65) Prior Publication Data

US 2013/0322418 A1 Dec. 5, 2013

Related U.S. Application Data

(60) Provisional application No. 61/654,698, filed on Jun. 1, 2012, provisional application No. 61/693,662, filed on Aug. 27, 2012.

(51) Int. Cl.
H04W 48/20 (2009.01)
H04W 48/14 (2009.01)

(52) U.S. Cl.
CPC ............. *H04W 48/20* (2013.01); *H04W 48/14* (2013.01)

(58) Field of Classification Search
CPC ... H04W 24/10; H04W 48/14; H04W 48/20; H04W 12/06; H04W 48/08
USPC ........................ 370/310, 328, 338
See application file for complete search history.

(56) References Cited

U.S. PATENT DOCUMENTS 5,659,598 A 8/1997 Byrne et al.
8,351,420 B2 * 1/2013 Linkola et al. ............... 370/352
(Continued)

FOREIGN PATENT DOCUMENTS

EP 1853080 11/2007
EP 2203014 A1 6/2010
(Continued)

OTHER PUBLICATIONS

"PCT Application No. PCT/US2013/043549 International Search Report and Written Opinion", Dec. 10, 2013, 19 pages.
(Continued)

*Primary Examiner* — Chi H Pham
*Assistant Examiner* — Robert Lopata
(74) *Attorney, Agent, or Firm* — DeLizio Law, PLLC

(57) ABSTRACT

An access point selector can implement functionality for selecting an access point that should establish a communication link with a client device attempting to join a communication network. The access point selector can receive notifications from access points, in response to the client device's button being activated. Information in the received notifications can be analyzed and one of the access points (that transmitted the notifications) can be selected to establish the communication link with the client device. In some embodiments, prior to selecting an access point that should establish the communication link with the client device, the access point selector can attempt to identify a designated access point (DAP) in the communication network. The access point selector may execute operations for selecting the access point only if the DAP cannot be identified in the communication network.

49 Claims, 10 Drawing Sheets

(56) References Cited

U.S. PATENT DOCUMENTS

| | | |
|---|---|---|
| 2005/0160287 A1 | 7/2005 | Mehta et al. |
| 2007/0104112 A1 | 5/2007 | Sayers et al. |
| 2008/0037444 A1 | 2/2008 | Chhabra |
| 2008/0259885 A1 | 10/2008 | Faulkner et al. |
| 2009/0098872 A1 | 4/2009 | Deshpande et al. |
| 2009/0161854 A1* | 6/2009 | Ku et al. ............... 379/207.16 |
| 2010/0008276 A1 | 1/2010 | Kopikare et al. |
| 2010/0009676 A1* | 1/2010 | Cormier et al. ........... 455/426.1 |
| 2010/0180016 A1 | 7/2010 | Bugwadia et al. |
| 2010/0227564 A1 | 9/2010 | Kaneko |
| 2011/0122835 A1* | 5/2011 | Naito et al. ................. 370/329 |
| 2011/0183704 A1* | 7/2011 | Moreno et al. ............... 455/522 |
| 2012/0083298 A1 | 4/2012 | Park et al. |
| 2012/0106496 A1* | 5/2012 | Sakai ........................... 370/329 |
| 2012/0250576 A1* | 10/2012 | Rajamani et al. ........... 370/254 |
| 2012/0269346 A1* | 10/2012 | Best et al. .................... 380/270 |
| 2013/0003874 A1* | 1/2013 | Abad Molina et al. ...... 375/257 |
| 2013/0003879 A1* | 1/2013 | Balleste et al. ............... 375/257 |
| 2013/0100895 A1* | 4/2013 | Aghili et al. ................. 370/329 |
| 2013/0229930 A1* | 9/2013 | Akay et al. ................... 370/252 |

FOREIGN PATENT DOCUMENTS

| | | |
|---|---|---|
| EP | 2309788 | 4/2011 |
| EP | 2445268 A1 | 4/2012 |
| GB | 2407003 | 4/2005 |
| WO | 0036846 | 6/2000 |
| WO | 2008059504 | 5/2008 |
| WO | 2011144101 A2 | 11/2011 |
| WO | 2013181500 | 12/2013 |

OTHER PUBLICATIONS

"PCT Application No. PCT/US2013/043549 Invitation to Pay Additional Fees and Partial Search Report", Sep. 25, 2013, 6 pages.

* cited by examiner

DEVICE CONFIGURATION IN A HYBRID COMMUNICATION NETWORK

RELATED APPLICATIONS

This applications claims priority of provisional U.S. Application No. 61/654,698 filed Jun. 1, 2012 and provisional U.S. Application No. 61/693,662 filed Aug. 27, 2012.

BACKGROUND

Embodiments of the inventive subject matter generally relate to the field of communication networks and, more particularly, to device configuration in a hybrid communication network.

Hybrid communication networks typically comprise multiple networking technologies (e.g., wireless local area network (WLAN) technologies, powerline communication technologies, Ethernet, etc.). Typically, the communication mechanisms and protocol specifics (e.g., device and topology discovery, bridging to other networks, etc.) are unique to each networking technology. The multiple networking technologies are typically interconnected using bridging-capable devices that forward frames between the different network technologies and media to form a single, extended communication network. The Institute of Electrical and Electronics Engineers (IEEE) Std. 1905.1 specification defines protocols, messages, and operating behavior that should be implemented by communication devices to provide hybrid communication functionality. More specifically, the IEEE Std. 1905.1 specification can introduce a software layer, between layers 2 and 3 of an Open Systems Interconnection (OSI) model, which abstracts the individual details of each network interface, aggregates available bandwidth, and facilitates seamless integration.

SUMMARY

Various embodiments for device configuration in a hybrid communication network are disclosed. In one embodiment, an access point selector of a communication network receives a plurality of notifications from a plurality of access points in the communication network for establishing a communication link with a client device, wherein the plurality of access points comprise the access point selector. The access point selector determines that a trigger associated with the client device and a trigger associated with a network device of the communication network are activated within a predetermined time interval. The access point selector determines that a first access point of the plurality of access points should establish the communication link with the client device based, at least in part, on information received in the notifications, in response to determining that the trigger associated with the client device and the trigger associated with the network device of the communication network are activated within the predetermined time interval. The access point selector notifies the first access point to establish the communication link with the client device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
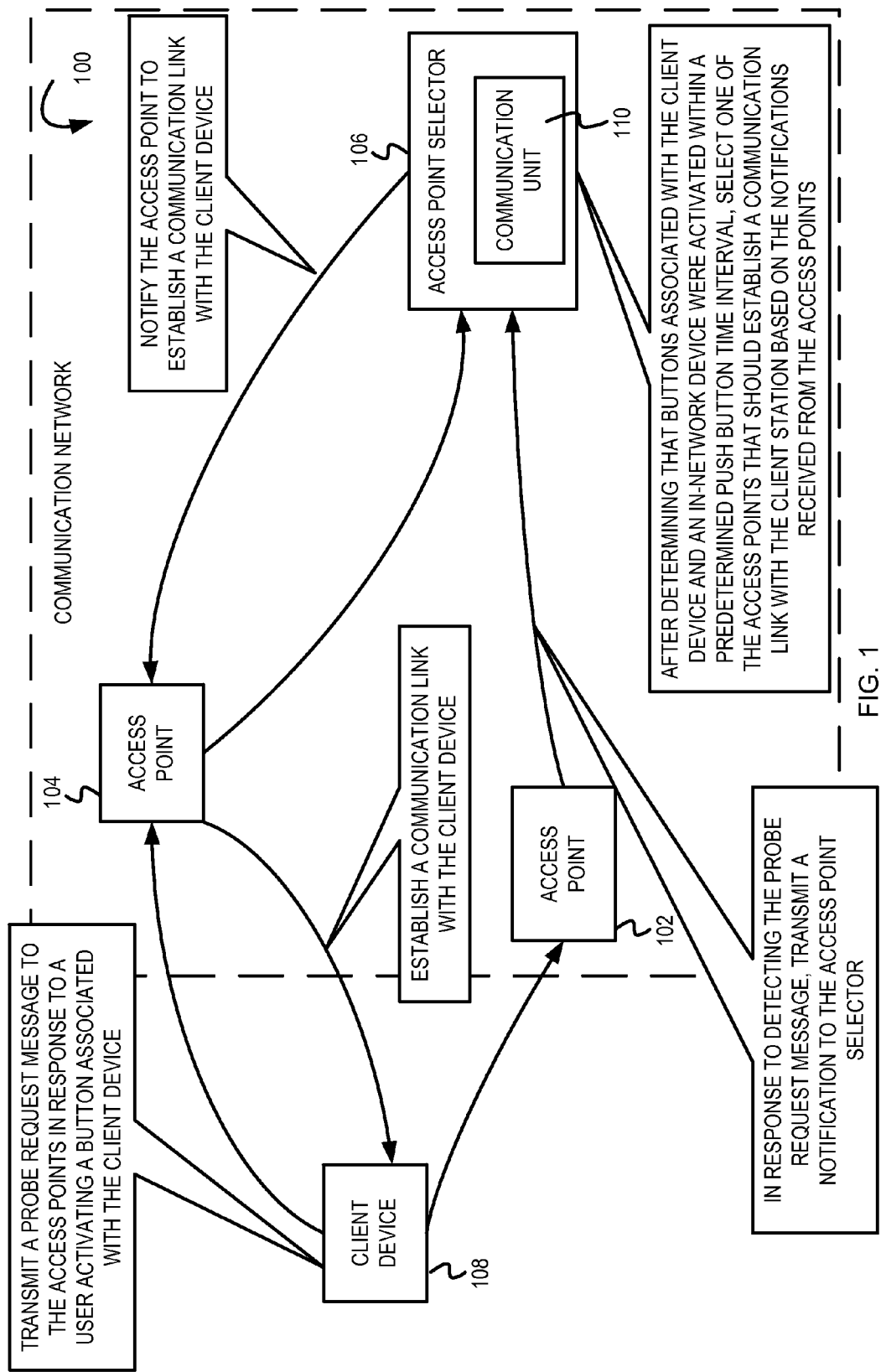
FIG. 1 is an example communication network including a mechanism for selecting an access point for establishing a communication link.

The description that follows includes exemplary systems, methods, techniques, instruction sequences, and computer program products that embody techniques of the present inventive subject matter. However, it is understood that the described embodiments may be practiced without these specific details. For instance, although examples refer to implementing a connection establishment mechanism for hybrid devices that connect to a wireless local area network (WLAN), an Ethernet, and a powerline communication (PLC) network, embodiments are not so limited. In other embodiments, hybrid devices that implement other suitable protocols and standards (e.g., WiMAX, Multimedia over Coax Alliance (MoCA®), etc.) can execute the connection establishment mechanism described herein. In other instances, well-known instruction instances, protocols, structures, and techniques have not been shown in detail in order not to obfuscate the description.

In a hybrid communication network (e.g., an IEEE Std. 1905.1 network), a push button mechanism can be used to enable a WLAN-capable client device to join the hybrid communication network. In accordance with the push button mechanism, a user can activate a button on the WLAN-capable client device and a button on any other network device within the hybrid communication network ("in-network device"), such as a WLAN-capable access point or any in-network device that is not an access point. After the push buttons on the WLAN-capable client device and the access point are activated, the access point can execute connection establishment procedures of the underlying access technology (e.g., Wi-Fi® push button connection (PBC) procedures defined in a Wi-Fi simple configuration (WSC) specification) to enable the WLAN-capable client device to automatically join the hybrid communication network. However, the connection establishment procedures are typically intended for a communication network that comprises a single access point. Hybrid communication networks typically comprise multiple underlying communication networks (e.g., WLAN, Ethernet, PLC network, etc.) and more than one access point. For example, the hybrid communication network may comprise two WLAN access points and one hybrid (e.g., WLAN and PLC) access point. When the push button of the WLAN-capable client device is activated in the hybrid communication network, more than one access point may detect the WLAN-capable client device and may attempt to establish a communication link with the WLAN-capable client device. If multiple access points attempt to execute connection establishment procedures with the WLAN-capable client device, this can result in session overlaps, connection establishment errors, and an inability to enroll the WLAN-capable client device in the hybrid communication network.

Existing techniques for eliminating session overlaps and connection establishment errors rely on either activating the access point for which the user has pressed the button or activating a designated access point, so that only one access point executes the connection establishment procedures with the WLAN-capable client device. However, the user may have to physically move the WLAN-capable client device within range of the designated access point or the user may have to physically press the button on an in-network access point that is within the range of the WLAN-capable client device. For example, if the WLAN-capable client device is outside the range of the designated access point and the user cannot physically access an in-network access point (e.g., if the access point is mounted on the ceiling), the WLAN-capable client device may fail to join the communication network. In this example, the user will have to move the WLAN-capable client device closer to the designated access point or will have to find another physically accessible access point so that the user can press the button on that physically accessible access point. Thus, the existing techniques for eliminating session overlaps and connection establishment errors can result in a non-ideal (or poor) user experience because the user may not have knowledge regarding why the WLAN-capable client device failed to join the communication network. The user may require additional instructions (and may need to perform additional configuration steps) to ensure that the WLAN-capable client device successfully joins the communication network.

In some embodiments, an access point selector can be employed in the hybrid communication network (e.g., the IEEE Std. 1905.1 network) to monitor probe request messages received by any in-network access point after the WLAN-capable client device's button is pushed. The access point selector can determine which access point should execute the connection establishment procedures (e.g., Wi-Fi push button connection procedures) with the WLAN-capable client device attempting to join the hybrid communication network. When a button of the WLAN-capable client device is activated, the WLAN-capable client device can transmit probe request messages that are detected by access points in the hybrid communication network. Instead of automatically starting the connection establishment procedures with the WLAN-capable client device in response to receiving the probe request messages, the access points can be configured to transmit a notification to the access point selector indicating receipt of the probe request message from the WLAN-capable client device. Receiving notifications from corresponding access points in the hybrid communication network can enable the access point selector to identify which access points are within a communication range of the WLAN-capable client device. After the access point selector determines that the buttons on the WLAN-capable client device and an in-network device (e.g., an access point, the access point selector, etc.) were activated, the access point selector can select an access point (e.g., from the access points that transmitted the notifications) that should execute the connection establishment procedures with the WLAN-capable client device. The access point selector can notify the selected access point to establish a communication link with the WLAN-capable client device. Employing an access point selector in the hybrid communication network can ensure that only one access point with a preferred detected signal strength (e.g., the access point with the strongest detected signal strength, that is closest to the WLAN-capable client device) executes the connection establishment procedures with the WLAN-capable client device. This can also simplify the connection process because the user may not need to worry about the location of the WLAN-capable client device with respect to the access point. Employing an access point selector can prevent session overlaps and connection establishment errors when the hybrid communication network comprises multiple access points.

FIG. 1 is an example communication network 100 including a mechanism for selecting an access point for establishing a communication link. The communication network 100 comprises access points 102 and 104 and an access point selector 106. The access point selector 106 comprises a communication unit 110. FIG. 1 also depicts a client device 108 that is attempting to join the communication network 100. In some embodiments, the client device 108, the access points 102 and 104, and the access point selector 106 can be IEEE Std. 1905.1 compatible devices (also referred to as "hybrid" devices). In some embodiments, the access point selector 106 can be an access point (e.g., as part of the access point 102 or the access point 104) or any in-network device (e.g., an IEEE Std. 1905.1 device), which may or may not have a WLAN interface. Furthermore, although the communication network 100 can comprise multiple access point selectors, only one access point selector may be active at any given time. For example, each of the access point selectors in the communication network 100 can advertise their respective medium access control (MAC) addresses (or other suitable device identifiers). The access points 102 and 104 can receive the advertised MAC addresses and select the access point selector 106 that is associated with the preferred MAC address. For example, the access point selector that is associated with the lowest MAC address may be selected. As another example, the access point selector that is associated with the highest MAC address may be selected. It is noted that in other embodiments, the access points 102 and 104 can use other suitable techniques to select one access point selector from multiple access point selectors in the communication network 100.

Although not explicitly depicted in FIG. 1, in some embodiments, the communication network 100 can comprise one or more hybrid devices (e.g., IEEE Std. 1905.1 compatible devices) and one or more legacy devices. The hybrid devices can each comprise multiple network interfaces that utilize a plurality of communication protocols to couple the hybrid device to a plurality of communication network segments of the communication network 100. For example, the hybrid device may comprise three network interfaces—a first WLAN interface configured as an access point, a second WLAN interface configured as a client station, and a powerline communication (PLC) interface. Each hybrid device can comprise the same number of network interfaces, different number of network interfaces, same type of network interfaces, or different type of network interfaces. The legacy devices may each be a non-hybrid device that comprises a single network interface that couples the legacy device to a single communication network segment. In FIG. 1, the access point selector 106, the access points 102 and 104, and the client device 108 can each be part of a hybrid device or a legacy device.

In some embodiments, the access point selector 106, the access points 102 and 104, and/or the client device 108 can each be a standalone WLAN device configured to execute operations described below in FIGS. 1-9. In other embodiments, the access point selector 106, the access points 102 and 104, and/or the client device 108 can each be electronic devices configured to implement one or more communication protocols, such as a laptop computer, a tablet computer, a mobile phone, a smart appliance, a gaming console, a desktop computer, or other suitable electronic devices. Although not depicted in FIG. 1, in some embodiments, the access points 102 and 104 and the client device 108 may each comprise a communication unit. The communication unit 110 of the access point selector 106 can be configured to execute operations described below with reference to FIGS. 1-5 and 9. The communication units of other network devices in the communication network (e.g., the access points 102 and 104) can execute operations described herein with reference to FIGS. 6-8. In some embodiments, the communication units of the access point selector 106, the access points 102 and 104, and/or the client device 108 can each be implemented on a system-on-a-chip (SoC), an application specific integrated circuit (ASIC), or another suitable integrated circuit to enable communications on their respective network device. In some embodiments, the communication units may each be implemented in one or more integrated circuits on one or more circuit boards of their respective network device.

The client device 108 transmits a probe request message to the access points 102 and 104 in response to a user activating a button associated with the client device 108. For example, the user can activate the button on the client device 108 (e.g., the user can press a virtual button or a physical button) to indicate that the client device 108 should be enrolled in the communication network 100 using connection establishment procedures. In response to detecting that the button associated with the client device 108 was activated, the client device 108 (e.g., a communication unit of the client device 108) can broadcast a probe request message. The probe request message can comprise a client device identifier, communication capabilities of the client device 108, and other suitable information. The access points 102 and 104 in the communication network 100 can detect the probe request message. It is noted that in other embodiments, the client device 108 can transmit a probe request message to the access points 102 and 104 in response to activation of another suitable trigger (e.g., a switching device) associated with the client device 108.

The access point 102 transmits a notification to the access point selector 106, in response to detecting the probe request message. For example, in response to receiving the probe request message from the client device 108, the access point 102 (e.g., a communication unit) can transmit a notification to the access point selector 106 indicating that a request for executing connection establishment procedures (e.g., push button connection procedures) was received from the client device 108. Likewise, in response to receiving the probe request message from the client device 108, the access point 104 (e.g., a communication unit) can transmit a notification to the access point selector 106 indicating that a request for executing connection establishment procedures was received from the client device 108. The notifications to the access point selector 106 can comprise an access point identifier, a client device identifier, communication bands and protocols supported by the client device 108, communication bands and protocols supported by the access point, and a signal strength associated with the probe request message received from the client device 108. In some embodiments, the communication network 100 may comprise only one access point selector. In this embodiment, each of the access points 102 and 104 can be configured to broadcast their respective notifications in the communication network 100. In other embodiments, the communication network 100 can comprise multiple access point selectors and one of the access point selectors may be selected (to perform the operations described herein) at any given time. In this embodiment, each of the access points 102 and 104 can be configured to transmit a unicast notification to the selected access point selector 106.

After determining that buttons associated with the client device and an in-network device were activated within a predetermined push button time interval, the access point selector 106 can select one of the access points that should establish a communication link with the client device based on the notifications received from the access points. In some embodiments, as will be described in FIG. 3, the button associated with the client device 108 may be activated before the button associated with the in-network device is activated. In other embodiments, as will be described in FIG. 4, the button associated with the in-network device may be activated before the associated with the client device 108 is activated. As will be further described in FIGS. 2-5, the access point selector 106 can select one of the access points 102 and 104 that should execute connection establishment procedures with the client device 108 based, at least in part, on the information (e.g., the detected signal strength) provided by the access points 102 and 104. In the example of FIG. 1, the access point selector 106 determines that the access point 104 should execute the push button connection procedures (and establish a communication link) with the client device 108.

The access point selector 106 notifies the selected access point 104 to establish a communication link with the client device 108. As will be described below in FIGS. 2-5, the access point selector 106 can transmit a notification to prompt the selected access point 104 to execute the connection establishment procedures (and establish a communication link) with the client device 108.

The access point 104 establishes a communication link with the client device 108. As will be further described in FIGS. 3-4, the access point 104 and the client device 108 can execute the connection establishment procedures, exchange handshake messages, and establish the communication link. The access point 104 can then transmit a notification to the access point selector 106 indicating that the client device 108 was successfully enrolled in the communication network 100.

It is noted that although FIG. 1 describes access point selection operations being executed in response to activating a button associated with the client device 108 and an in-network device, embodiments are not so limited. In other embodiments, the access point selection operations can be executed in response to activation of other suitable triggers (e.g., a switching device) associated with the client device 108 and the in-network device.

Figure 2:
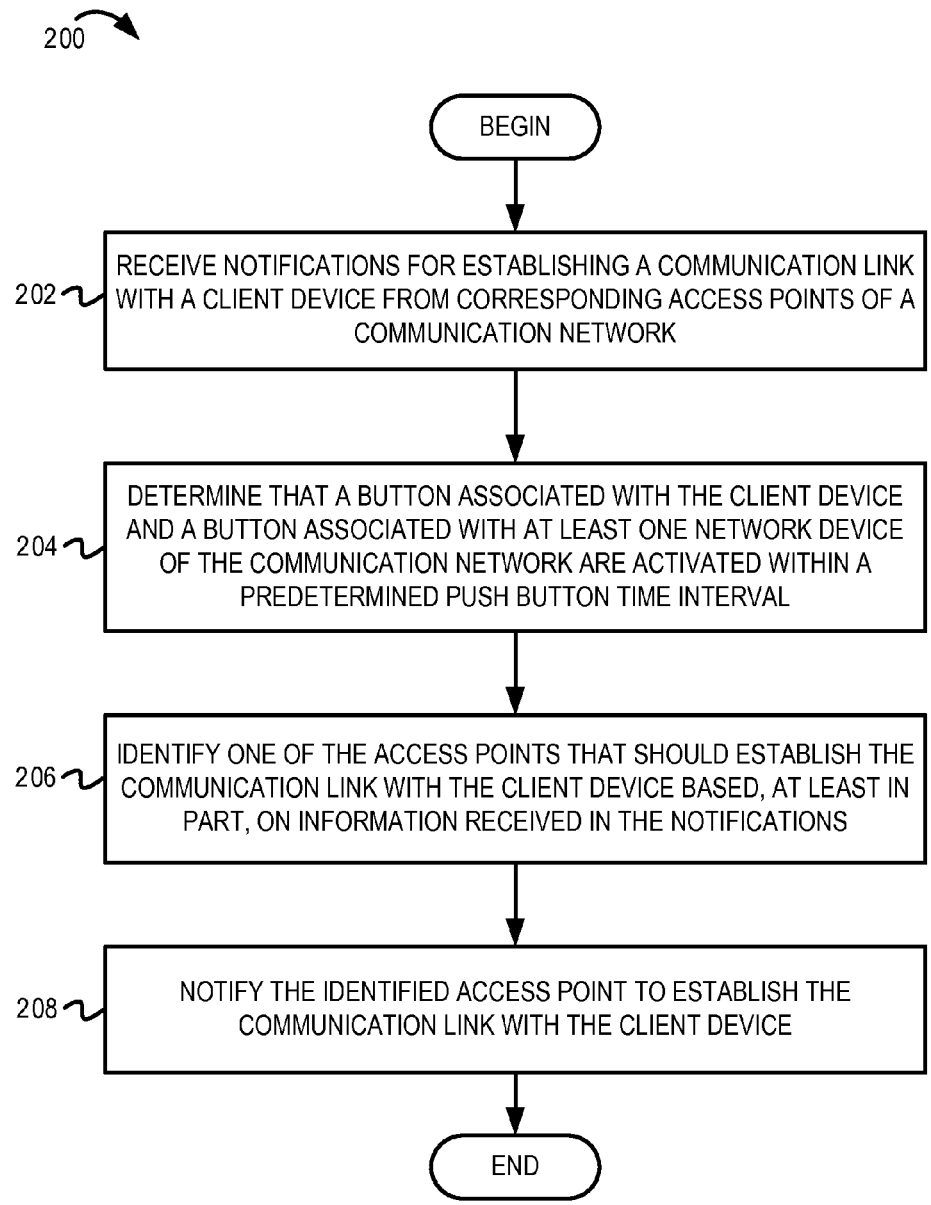
FIG. 2 is a flow diagram illustrating example operations for access point selection in a hybrid communication network.

FIG. 2 is a flow diagram illustrating example operations for access point selection in a hybrid communication network. The flow 200 begins at block 202.

At block 202, notifications for establishing a communication link with a client device are received from corresponding access points of a communication network. With reference to the example of FIG. 1, the access point selector 106 can receive notifications (also referred to as "access probe messages") from corresponding access points 102 and 104 of the communication network 100. As will be further described below in FIGS. 3-5, the notifications received from the access points 102 and 104 can comprise an indication that a client device is attempting to join the communication network (e.g., that a button associated with the client device 108 was activated). The notifications received from the access points 102 and 104 can each comprise signal strength information (or other suitable performance measurements) associated with the client device 108. The flow continues at block 204.

At block 204, it is determined that a button associated with the client device and a button associated with at least one network device of the communication network were activated within a predetermined push button time interval. The in-network device can be an access point 102, 104, the access point selector 106, or another suitable hybrid device (with or without WLAN communication capabilities) of the communication network 100. In some embodiments, as will be further described in FIGS. 3 and 5, the button of the client device can be activated before the button of the in-network device is activated. In other embodiments, as will be further described in FIGS. 4 and 5, the button of the in-network device can be activated before the button of the client device is activated. The flow continues at block 206.

At block 206, one of the access points that should establish the communication link with the client device is identified based, at least in part, on information received in the notifications. With reference to the example of FIG. 1, the access point selector 106 may receive the notifications from the access points 102 and 104 requesting permission to establish the communication link with the client device 108. Based on signal strength information in the received notifications, the access point selector 106 (e.g., a selection unit, not shown) may determine that the access point 102 should establish the communication link with the client device 108. For example, the access point selector 106 may determine that the access point 102 detected a higher signal strength (and/or a lower error rate) from the client device 108 as compared to the access point 104. The flow continues at block 208.

At block 208, the access point selector notifies the identified access point to establish the communication link with the client device. The access point 102 can then execute connection establishment procedures (e.g., push button connection procedures) with the client device 108 to establish the communication link with the client device 108. From block 208, the flow ends.

Figure 3:
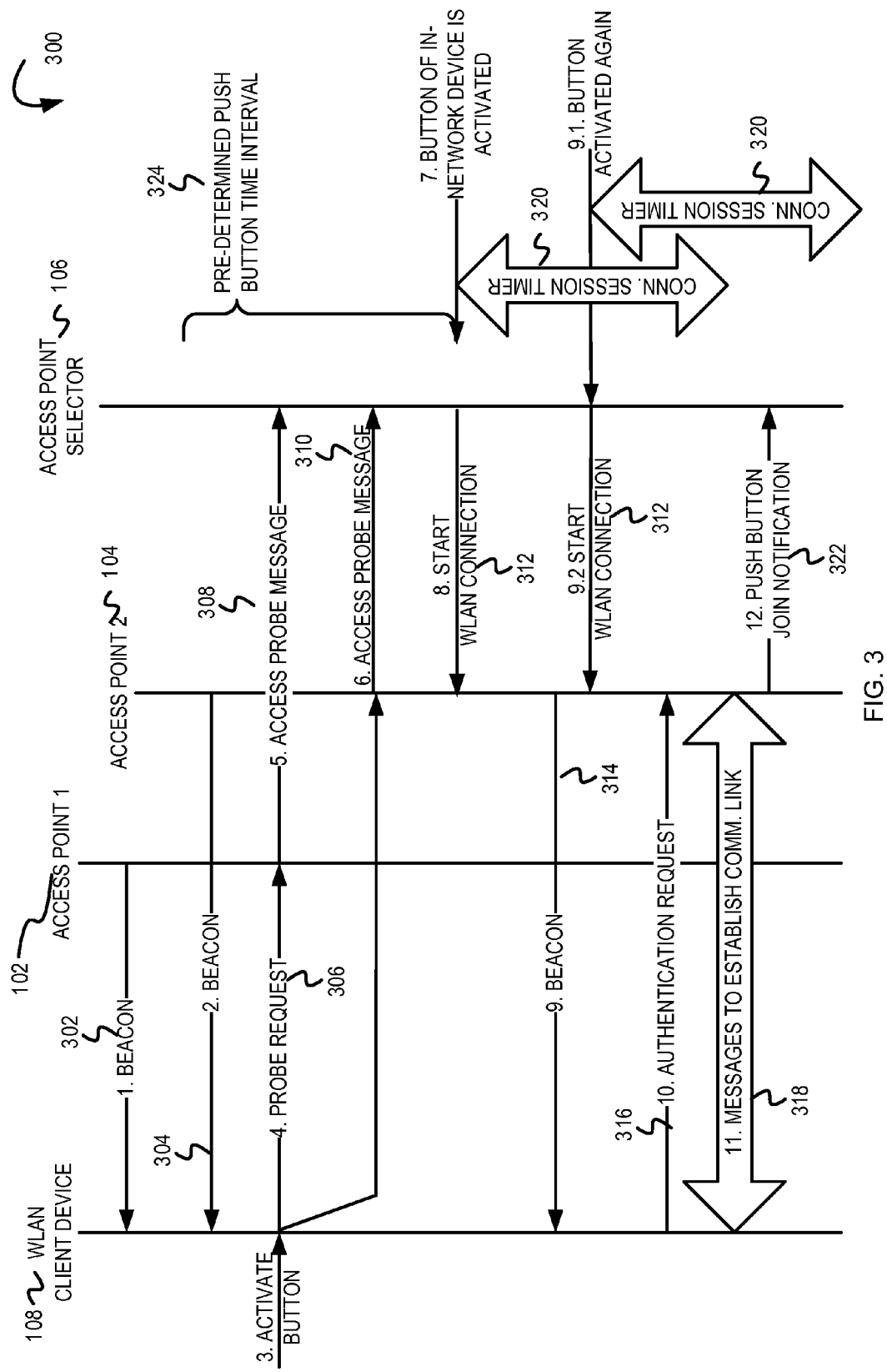
FIG. 3 is a timing diagram illustrating an example embodiment for selecting an access point to execute connection establishment procedures.
Figure 4:
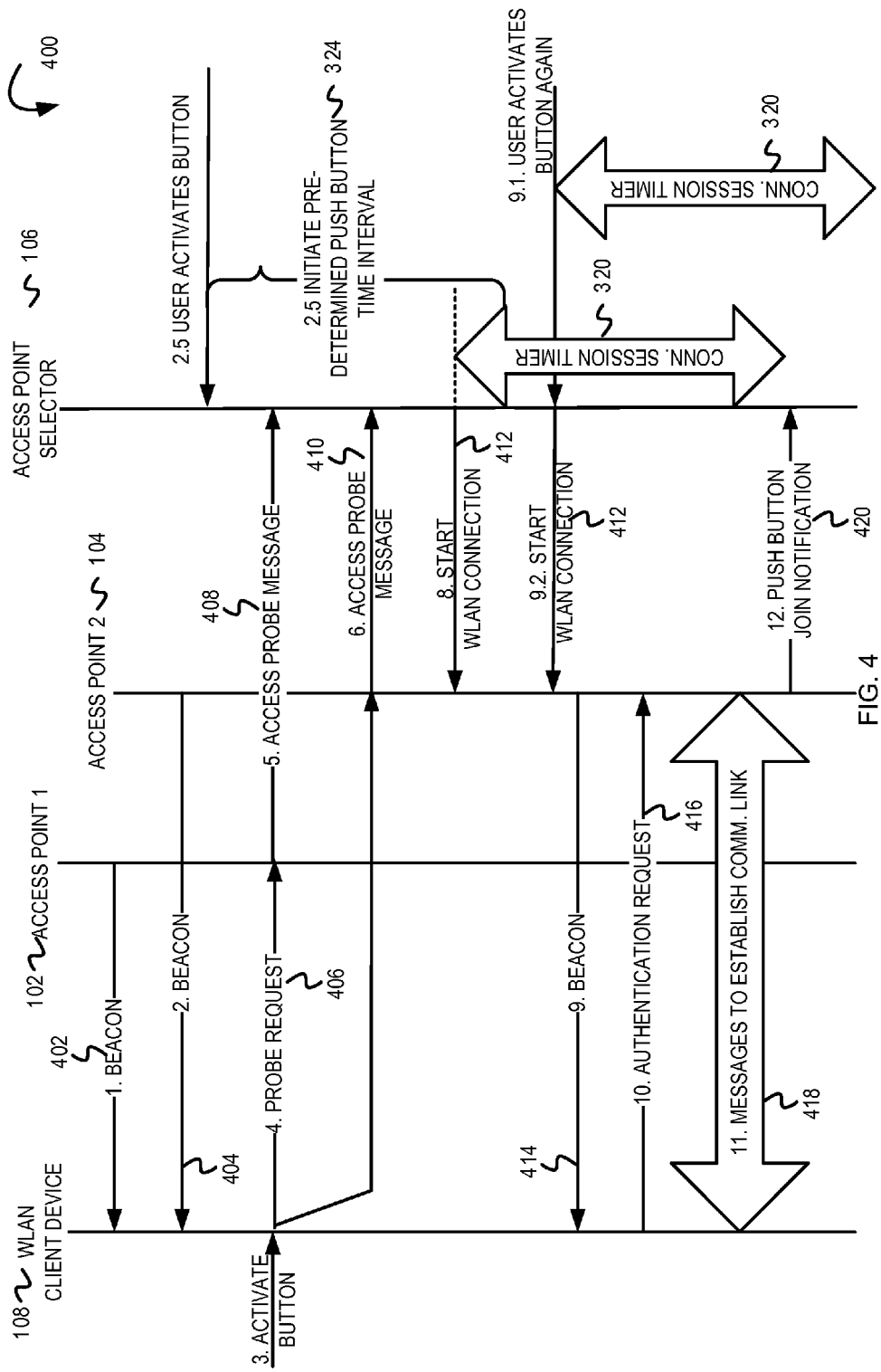
FIG. 4 is a timing diagram illustrating another example embodiment for selecting an access point to execute connection establishment procedures.
Figure 5:
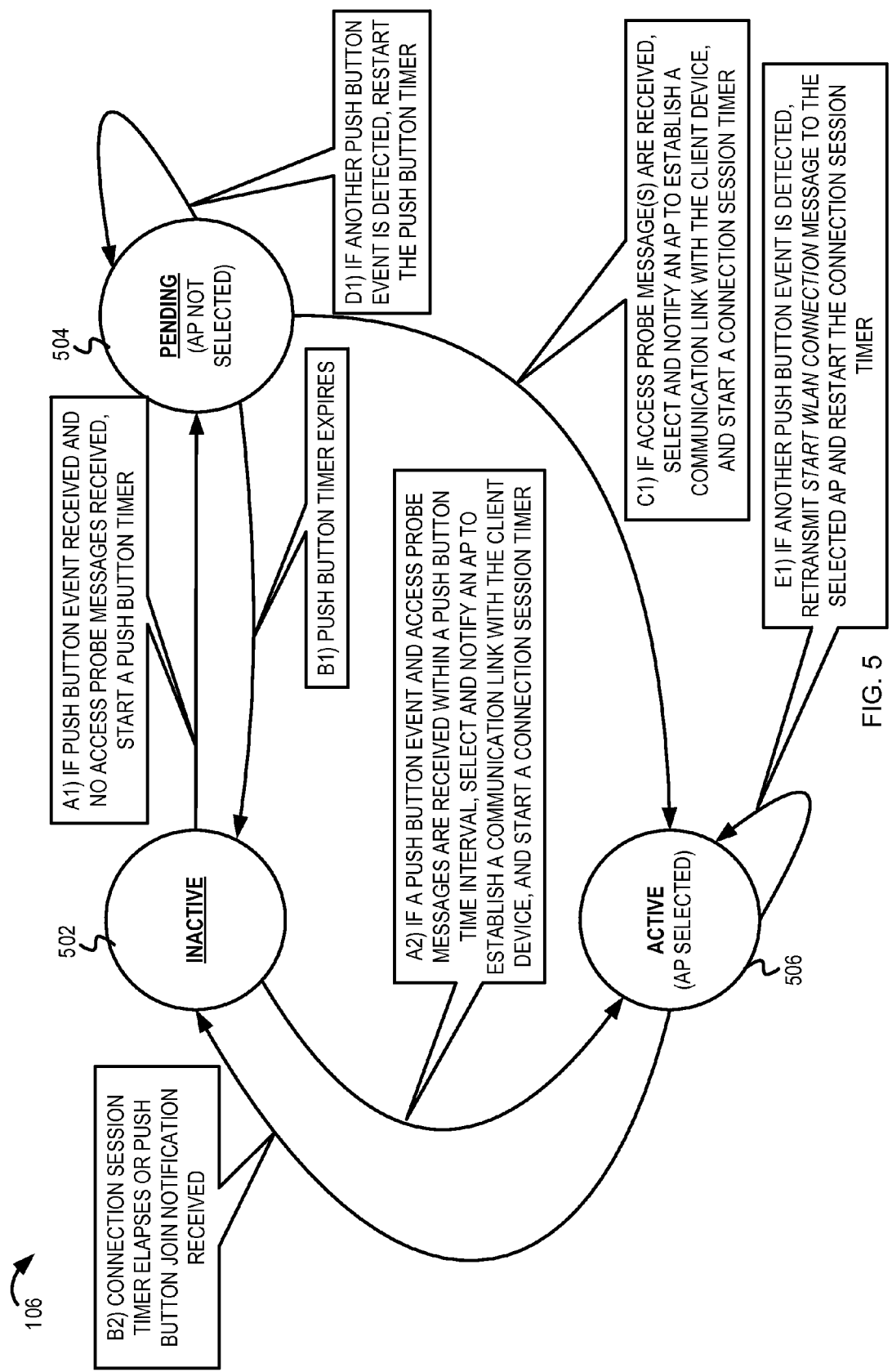
FIG. 5 is a state diagram including example operating states of the access point selector.

As indicated above, the access point selector 106 can execute different operations depending on whether the button of the client device 108 is activated before or after the button of an in-network device is activated. FIGS. 3-5 will further illustrate an example sequence of operations for selecting an access point that should establish the communication link with the client device attempting to join the communication network.

FIG. 3 is a timing diagram 300 illustrating an example embodiment for selecting an access point to execute connection establishment procedures. FIG. 3 depicts the client device 108, the access points 102 and 104, and the access point selector 106. In some embodiments, as depicted in FIG. 3, the client device 108, the access points 102 and 104, and the access point selector 106 can each be IEEE Std. 1905.1 compatible devices. Additionally, the client device 108 and the access points 102 and 104 can each be WLAN-capable devices. The flow of operations (and messages exchanged) described in FIG. 3 are in response to the user activating a button associated with the client device 108 prior to activating a button associated with an in-network device (e.g., the access point 102 or 104 or the access point selector 106). The operations for selecting an access point are described below in the following steps.

At step 1, the client device 108 receives a beacon message 302 broadcast by the access point 102. At step 2, the client device 108 receives a beacon message 304 broadcast by the access point 104. Each of the beacon messages 302 and 304 can comprise a Wi-Fi simple configuration (WSC) information element (IE), an access point identifier, communication capabilities of the access point, and other suitable information. At step 3, a user activates a button associated with the client device 108. For example, the user can push an IEEE Std. 1905.1 button associated with the client device 108. At step 4, the client device 108 transmits/broadcasts a probe request message 306 to the access points 102 and 104. The probe request message 306 can comprise a WSC IE, a request for executing connection establishment procedures, a client device identifier, communication capabilities of the client device 108, and other suitable information. At step 5, the access point 102 transmits an access probe message 308 to the access point selector 106; and at step 6, access point 104 transmits an access probe message 310 to the access point selector 106. Each of the access probe messages 308 and 310 can be a notification to the access point selector 106 indicating that a request for executing connection establishment procedures was received from the client device 108. Reception of the access probe messages 308 and 310 can indicate (to the access point selector 106) that a client device 108 is attempting to join the communication network 100. Reception of the access probe messages 308 and 310 can also indicate (to the access point selector 106) that the access points 102 and 104 are within a communication range of the client device 108. In one example, the access probe messages 308 and 310 can be IEEE Std. 1905.1 messages. The access probe messages 308 and 310 can comprise an access point identifier, a client device identifier, communication capabilities (e.g., communication bands, supported protocols, etc.) of the access point, communication capabilities (e.g., communication bands, supported protocols, etc.) of the client device 108, and a signal strength associated with the probe request message received at the access point.

At step 7, the access point selector 106 determines that the user activated a button on an in-network device of the communication network 100. For example, the user can activate/push a button associated with one of the access points 102 or 104 of the communication network 100. As another example, the user can activate/push a button associated with the access point selector 106. As another example, the user can activate/push a button associated with any suitable communication device (e.g., a WLAN communication device, a PLC device, etc.) of the communication network 100. The access point selector 106 can receive a push button event notification (also referred to herein as an "activation event message") from the in-network device (e.g., the access points 102, 104). In some embodiments, the in-network device can transmit the push button event notification to the access point selector 106 via a WLAN communication network. In other embodiments, however, the in-network device can transmit the push button event notification to the access point selector 106 via any suitable communication medium (e.g., a PLC medium). After the access point selector 106 determines that the button associated with the in-network device was activated, the access point selector 106 can determine whether the user has already activated the button associated with the client device 108. For this, the access point selector 106 can determine whether it received any access probe messages within a preceding pre-determined push button time interval 324. As depicted in FIG. 3, the pre-determined push button time interval 324 can end at the time instant when the push button of the in-network device is activated. In the example of FIG. 3, the access point selector 106 identifies all the access points 102 and 104 that transmitted the access probe messages 308 and 310 within the preceding pre-determined push button time interval 324. For example, after detecting that the button associated with the in-network device was activated, the access point selector 106 can determine which (if any) access points transmitted the access probe messages within a preceding time interval (e.g., which access points received the probe request message 306 from the client device 108).

The access point selector 106 can then determine which of the access points should execute the connection establishment procedures and establish the communication link with the client device 108. In some embodiments, the access point selector 106 can select the access point that should execute the connection establishment procedures based on the signal strength information received in the access probe messages. For example, the access point selector 106 can select the access point associated with a preferred detected signal strength (e.g., a highest detected signal strength). As another example, the access point selector 106 can select the access point that should establish the communication link with the client device 108 based on performance measurements (e.g., detected signal strength, error rate, etc.) associated with the access points. In other embodiments, the access point selector 106 can select the access point that should execute the connection establishment procedures based on analyzing the communication capabilities of the client device 108 and the access points 102 and 104. With reference to FIG. 3, the access point selector 106 determines that the access point 104 should execute the connection establishment procedures (e.g., push button connection procedures) with the client device 108. At step 8, the access point selector 106 transmits a "Start WLAN connection" message 312 to the selected access point 104. The "Start WLAN connection" message 312 can indicate that the access point 104 should initiate connection establishment procedures with the client device 108 to establish a communication link with the client device 108. In some embodiments, the "Start WLAN connection" message 312 can be an IEEE Std. 1905.1 message. Additionally, at step 8, the access point selector 106 can start a connection session timer 320 that comprises the duration of the connection session (e.g., the time interval) during which the access point 104 can establish a communication link with the client device 108. Maintaining the connection session timer 320 can ensure that if the access point selector 106 detects another push button event notification for the same client device 108, the access point selector 106 needs not re-determine the access point that should execute the connection establishment procedures, as will be described below.

In response to receiving the "Start WLAN connection" message 312, the access point 104 can start the connection establishment procedures. For example, at step 9, the access point 104 can transmit a beacon message 314 including the WSC IE and an indication of the start of the connection establishment procedures. In some embodiments, at step 9.1, the access point selector 106 may determine that the user has activated/pushed a button associated with an in-network device (e.g., the access point 102, the access point 104, the access point selector 106, etc.) for a second time. The access point selector 106 can determine that the connection session timer 320 is still valid and has not expired. Accordingly, at step 9.2, the access point selector 106 can determine that the access point 104 was previously selected to execute the connection establishment procedures with the client device 108. The access point selector 106 can re-transmit the "Start WLAN connection" message 312 to the access point 104 and can restart the connection session timer 320. At step 10, in response to the beacon message 314, the client device 108 can transmit an authentication request message 316 to the access point 104. At step 11, the access point 104 and the client device 108 can exchange handshake messages 318 (e.g., Extensible Authentication Protocol (EAP) messages) for authentication and authorization of the client device 108. At step 12, after the communication link is established with the client device 108, the access point 104 can transmit a push button join notification message 322 indicating that the client device 108 was successfully enrolled in the communication network 100. In some embodiments, the push button join notification message 322 can be an IEEE Std. 1905.1 message.

FIG. 4 is a timing diagram 400 illustrating another embodiment for selecting an access point to execute connection establishment procedures. FIG. 4 depicts the client device 108, the access points 102 and 104, and the access point selector 106. In some embodiments, as depicted in FIG. 4, the client device 108, the access points 102 and 104, and the access point selector 106 can each be IEEE Std. 1905.1 compatible devices. Additionally, the client device 108 and the access points 102 and 104 can each be WLAN-capable devices. The flow of operations (and messages exchanged) described in FIG. 4 are in response to the user activating a button associated with an in-network device (e.g., the access point 102 or 104 or the access point selector 106) prior to activating a button associated with the client device 108. The operations for selecting an access point are described below in the following steps.

At step 1, the client device 108 detects a beacon 402 broadcast by the access point 102. At step 2, the client device 108 detects a beacon 404 broadcast by the access point 104. Each of the beacon messages 402 and 404 can comprise a WSC information element (IE), an access point identifier, communication capabilities of the access point, and other suitable information. At step 2.5, the access point selector 106 determines that a user activated a button associated with an in-network device. For example, the user can activate/push a button associated with the access point selector 106. As another example, the user can activate/push a button associated with one of the access points 102 or 104 or another suitable communication device of the communication network 100. In this example, the in-network device (e.g., the access point 102) can transmit a push button event notification (also referred to as activation event message) to the access point selector 106 (e.g., via a WLAN communication network or via any suitable communication medium). After determining that a button associated with an in-network device was activated (e.g., after receiving the push button event notification), the access point selector 106 may determine that access probe messages were not received during a preceding pre-determined push button time interval. Accordingly, the access point selector 106 can infer that only the button on the in-network device was activated and that the button on the client device 108 has not been activated. Therefore, at step 2.5, the access point selector 106 can initiate a pre-determined push button time interval 324 (that begins at the time instant when the button associated with the in-network device was activated) to identify at least one access point that is within a communication range of the client device 108 attempting to join the communication network 100. For example, after determining that a button associated with an in-network device was activated, the access point selector 106 can determine that no access probe messages were received during a preceding predetermined push button time interval and therefore, that the button on the client device 108 was not activated. The access point selector 106 can then start a push button time interval 324 to wait for access probe messages from access points in the communication network 100.

At step 3, a button associated with the client device 108 is activated. For example, the user can push an IEEE Std. 1905.1 button associated with the client device 108. At step 4, the client device 108 transmits/broadcasts a probe request message 406 to the access points 102 and 104. The probe request message 406 can comprise a WSC IE, a request for executing connection establishment procedures, a client device identifier, communication capabilities of the client device 108, and other suitable information. At step 5, the access point 102 transmits an access probe message 408 to the access point selector 106; and at step 6, access point 104 transmits an access probe message 410 to the access point selector 106. Each of the access probe messages 408 and 410 can be a notification to the access point selector 106 indicating that a request for executing connection establishment procedures (e.g., push button connection procedures) was received from the client device 108. Reception of the access probe messages 408 and 410 can indicate (to the access point selector 106) that the client device 108 is attempting to join the communication network 100. Reception of the access probe messages 408 and 410 can also indicate (to the access point selector 106) that the access points 102 and 104 are within a communication range of the client device 108. In one example, the access probe messages 408 and 410 can be IEEE Std. 1905.1 messages. The access probe messages 408 and 410 can comprise an access point identifier, a client device identifier, communication capabilities (e.g., communication bands, supported protocols, etc.) of the access point, communication capabilities (e.g., communication bands, supported protocols, etc.) of the client device 108, and a signal strength associated with the probe request message received at the access point.

In response to receiving the access probe messages 408 and 410 within the predetermined push button time interval 324 (started at step 2.5), the access point selector 106 can determine that the buttons on both the client device 108 and an in-network device were activated and that the access points 102 and 104 are within a communication range of the client device 108. The access point selector 106 can then determine which access point should execute the connection establishment procedures (and establish the communication link) with the client device 108. In some embodiments, the access point selector 106 can select the access point that should execute the connection establishment procedures based on the signal strength information received in the access probe messages. In other embodiments, the access point selector 106 can select the access point that should execute the connection establishment procedures based on the communication capabilities of the client device 108 and the access points 102 and 104. In the example of FIG. 4, the access point selector 106 determines that the access point 104 should execute the connection establishment procedures and establish the communication link with the client device 108.

At step 8, the access point selector 106 transmits a "Start WLAN connection" message 412 to the access point 104. The "Start WLAN connection" message 412 can indicate that the access point 104 should initiate connection establishment procedures with the client device 108 to establish a communication link with the client device 108. In some embodiments, the "Start WLAN connection" message 412 can be an IEEE Std. 1905.1 message. Additionally, at step 8, the access point selector 106 can start a connection session timer 320 that comprises the duration of the connection session (e.g., the time interval) during which the access point 104 can establish a communication link with the client device 108. Maintaining the connection session timer 320 can ensure that if the access point selector 106 detects another push button event notification for the same client device 108, the access point selector 106 need not re-determine which access point should execute the connection establishment procedures. In some embodiments, at step 9.1, the access point selector 106 determines that the user has activated a button associated with an in-network device for a second time. The access point selector 106 can determine that the connection session timer 320 is still valid and has not expired. Accordingly, at step 9.2, the access point selector 106 can determine that the access point 104 was previously selected to execute the connection establishment procedures with the client device 108. The access point selector 106 can re-transmit the "Start WLAN connection" message 412 to the access point 104 and can restart the connection session timer 320.

In response to receiving the "Start WLAN connection" message 412, the access point 104 can start the connection establishment procedures (e.g., push button connection procedures). For example, at step 9, the access point 104 can transmit a beacon message 414 including the WSC IE and an indication of the start of the connection establishment procedures. In response to the beacon message 414, the client device 108 can transmit an authentication request message 416 to the access point 104 at step 10. At step 11, the access point 104 and the client device 108 can exchange handshake messages 418 (e.g., EAP messages) for authentication and authorization of the client device 108. After the communication link is established with the client device 108, the access point 104 can transmit (at step 12) a push button join notification message 420 indicating that the client device 108 was successfully enrolled in the communication network 100. In some embodiments, the push button join notification message 420 can be an IEEE Std. 1905.1 message.

FIG. 5 is a state diagram including example operating states of the access point selector 106. In some embodiments, the access point selector 106 can operate in three operating states—an inactive operating state 502, a pending operating state 504, and an active operating state 506. The access point selector 106 can be idle in the inactive operating state 502. The access point selector 106 may not maintain timers, execute access point selection operations described above, or transmit messages in the inactive operating state 502. In the inactive operating state 502, the access point selector 106 can wait to 1) detect activation of a button associated with itself or another in-network device and/or 2) detect activation of a button associated with a client device by receiving an access probe message from an access point. In FIG. 5, the access point selector 106 operates in accordance with stages A1-E1 if the button associated with the client device is activated before the button associated with an in-network device is activated.

At stage A1, the access point selector 106 receives a push button event (also referred to as an activation event message) from an in-network device (or detects that a button on the access point selector 106 has been pushed). If the access point selector 106 determines that an access probe message was not previously received from an access point, the access point selector 106 can start a push button timer. As depicted in FIG. 5, the access point selector 106 can then switch from the inactive operating state 502 to the pending operating state 504. In the pending operating state 504, the access point selector 106 can wait to receive an indication that the button associated with the client device 108 was pushed (e.g., an access probe message). Therefore, the access point selector 106 may not execute operations ("access point selection operations") for selecting an access point that should establish the communication link with the client device 108. At stage B1, if the push button timer expires, the access point selector 106 can switch from the pending operating state 504 to the inactive operating state 502. While in the pending operating state 504, if the access point selector 106 receives access probe messages (from corresponding access points), the access point selector 106 can execute the access point selection operations, transmit a "Start WLAN connection" notification to the selected access point, and start a connection session timer. This is illustrated by stage C1. The access point selector 106 can switch from the pending operating state 504 to the active operating state 506. It is noted, as depicted in stage D1, that if the access point selector 106 receives another push button event notification (or detects that its own button was activated again) while the access point selector 106 is in the pending operating state 504, the access point selector 106 can restart the push button timer. Furthermore, as depicted in stage E1, if the access point selector 106 receives another push button event notification (or detects that its own button was activated again) while the access point selector 106 is in the active operating state 506, the access point selector 106 can retransmit the "Start WLAN connection" notification to the selected access point (selected at stage C1) and can restart the connection session timer.

The access point selector 106 can operate in accordance with stages A2 and B2 if the button associated with the client device 108 is activated after the button associated with an in-network device is activated. At stage A2, the access point selector 106 receives a push button event from an in-network device (or detects that a button on the access point selector 106 has been pushed). As described with reference to FIG. 4, the access point selector 106 can determine that access probe messages were received from corresponding access points within a preceding push button time interval. Therefore, the access point selector 106 can switch from the inactive operating state 502 to the active operating state 506 and can bypass the pending operating state 504. At stage A2, the access point selector 106 can execute the access point selection operations, transmit a "Start WLAN connection" notification to the selected access point, and start the connection session timer.

At stage B2, if the connection session timer elapses or if the access point selector 106 receives a push button join notification message, the access point selector 106 can switch from the active operating state 506 to the inactive operating state 502. As described above in stage E1, while the access point selector 106 is in the active operating state 506, if the access point selector 106 receives another push button event notification (or detects that its own button was activated again), the access point selector 106 can retransmit the "Start WLAN connection" notification to the access point (selected at stage A2) and can restart the connection session timer.

In some embodiments, network devices (e.g., a hybrid device that implements multiple communication protocols, an IEEE Std. 1905.1 compatible device, etc.) in a communication network may or may not be configured to operate in accordance with the access point selection mechanism described above. For example, some access points may receive probe request messages and may transmit notifications in access probe messages to the access point selector 106 in accordance with the access point selection mechanism (described above in FIGS. 1-5), while other network devices may not. The network devices that do not operate in accordance with the access point selection mechanism described above may rely on the presence of a designated access point (DAP) in the communication network. In these embodiments, the DAP and the access point selector (APS) may co-exist in the same communication network. This can result in a collision between the DAP and the APS. The following techniques described in accordance with FIGS. 6-9 can be implemented to minimize and preferably eliminate collisions between the DAP and the APS and to ensure that either the DAP executes the connection establishment operations with a client device or the APS identifies an access point that should execute the connection establishment operations with the client device.

In some embodiments, when the DAP and the APS coexist in the communication network, the DAP can be configured to transmit a new multicast/broadcast message ("WLAN connection started message") to advertise the presence of the DAP and to indicate that the DAP is currently executing WLAN connection establishment (or just "connection establishment" hereafter) operations with the client device 108. The access point selector 106 can be configured to abort (or not execute) the access point selection operations and to relinquish control to the DAP in response to receiving the WLAN connection started message from the DAP or in response to receiving the push button event notification (PBEN) message that includes the WLAN media information of an AP. In another embodiment, if an in-network device (whose button was activated) supports the access point selection operations (described above in FIGS. 1-5), the in-network device can attempt to identify the access point selector using suitable messages. For example, the in-network device can transmit an APS search message (a multicast/broadcast message) and can wait to receive an APS response message (e.g., a unicast message). The APS response message can include an identifier of the APS (e.g., a 1905.1 AL MAC address or other suitable device identifier). If the APS can be identified and if the in-network device is configured as an access point (or comprises an access point module), then the in-network device can relinquish control to the APS, and the APS can execute the access point selection operations described above. Otherwise, the in-network device (i.e., when configured as an access point) can execute the connection establishment operations with the client device.

In another embodiment, the APS can be configured to attempt to locate the DAP prior to initiating the access point selection operations described above in FIGS. 1-5. In one example, the APS can use AP-Autoconfig Search/Response messages to locate the DAP. The APS can indicate (e.g., in an AP-Autoconfig Search message) that it is attempting to locate the DAP of the communication network. If the APS receives an appropriate response message from the DAP, the APS can infer that the communication network comprises a DAP. Accordingly, the APS can abort (or not execute) the access point selection operations and can relinquish control to the DAP. In some embodiments, the DAP can be configured to not transmit the WLAN connection started message if the DAP and the APS are configured to use the AP-Autoconfig Search/Response messages as described above. In another embodiment, the DAP can be configured to transmit the WLAN connection started message to advertise the presence of the DAP, even if the DAP and the APS are configured to use the AP-Autoconfig Search/Response messages as described above. It is further noted that any suitable message fields and any type of indications can be used to implement the AP-Autoconfig Search/Response process. Furthermore, it is noted that in other embodiments, the access point selector 106 can use other suitable messages and techniques to detect the presence of the DAP in the communication network.

To minimize/eliminate collisions between the DAP and the APS in the communication network, each of the network devices in the communication network can be classified into one of three device categories (or one of another suitable number of device categories) depending on the connection establishment protocols supported at each of the network devices. In some implementations, each of the network devices may be categorized as type A devices, type B devices, or type C devices. The type A device may be an IEEE Std. 1905.1 compliant device and configured to transmit the WLAN connection started message if the type A device is configured as a designated access point. The type B device may support the access-point selection mechanism described above in FIGS. 1-5, but the type B device may not be configured as an access point selector. The type B device may further be configured to transmit the WLAN connection started message if the type B device comprises a WLAN access point module (e.g., is configured as an access point), but cannot locate the access point selector of the communication network. The type C device may support the access-point selection mechanism described above in FIGS. 1-5, and may be configured as the access point selector of the communication network. Each of the type A, B, and C devices may comprise a WLAN access point module and/or a WLAN non-access point module (e.g., a WLAN client station module, also referred to as a WLAN STA module). In some implementations, the WLAN access point module may be further configured as the designated access point (DAP).

It is noted that although FIGS. 2-5 describe access point selection and connection establishment operations being executed in response to activating a button associated with the client device 108 and activating a button associated with an in-network device, embodiments are not so limited. In other embodiments, the access point selection and connection establishment operations can be executed in response to activation of other suitable triggers (e.g., a switching device) associated with the client device 108 and the in-network device.

Figure 6:
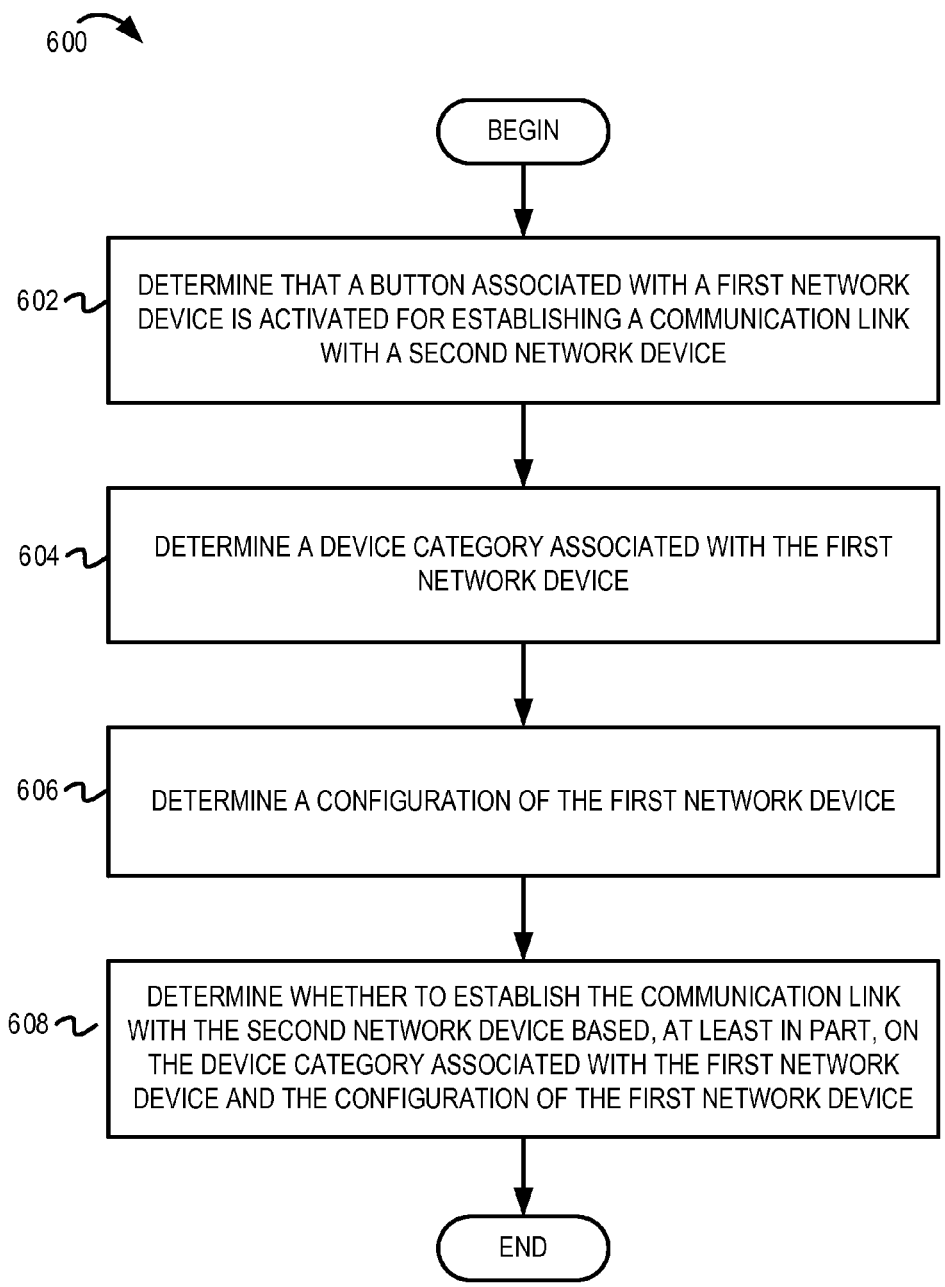
FIG. 6 is a flow diagram illustrating example operations of an in-network device, in response to detecting a push button event.

FIG. 6 is a flow diagram 600 illustrating example operations of an in-network device, in response to detecting a push button event. The flow 600 begins at block 602.

At block 602, a first network device determines that a button associated with the first network device is activated for establishing a communication link with a second network device. In one example, the first network device can be an access point of the communication network 100. In this example, the first network device may or may not be support (e.g., recognize/implement) the access point selection operations described above in FIGS. 1-5. In another example, the first network device can be an access point selector of the communication network 100. In another example, the first network device can be another suitable in-network device that may or may not comprise WLAN communication capabilities. The flow continues at block 604.

At block 604, a device category associated with the first network device is determined. For example, a communication unit of the first network device can determine the device category associated with the first network device. As discussed above, the device category can be indicative of connection establishment protocols supported at each of the network devices. In one embodiment described herein in FIGS. 7-9, the first network device can be classified as a type A device, a type B device, or a type C device. In other embodiments, the first network device can be classified into one of another suitable number of device categories. The flow continues at block 606.

At block 606, a configuration of the first network device is determined. For example, a communication unit (not shown) of the first network device can determine the configuration of the first network device. The configuration of the first network device can indicate whether the first network device comprises a WLAN AP module and/or a WLAN STA module. In some embodiments, the configuration of the first network device may indicate that the first network device does not comprise any WLAN module. The flow continues at block 608.

Figure 7:
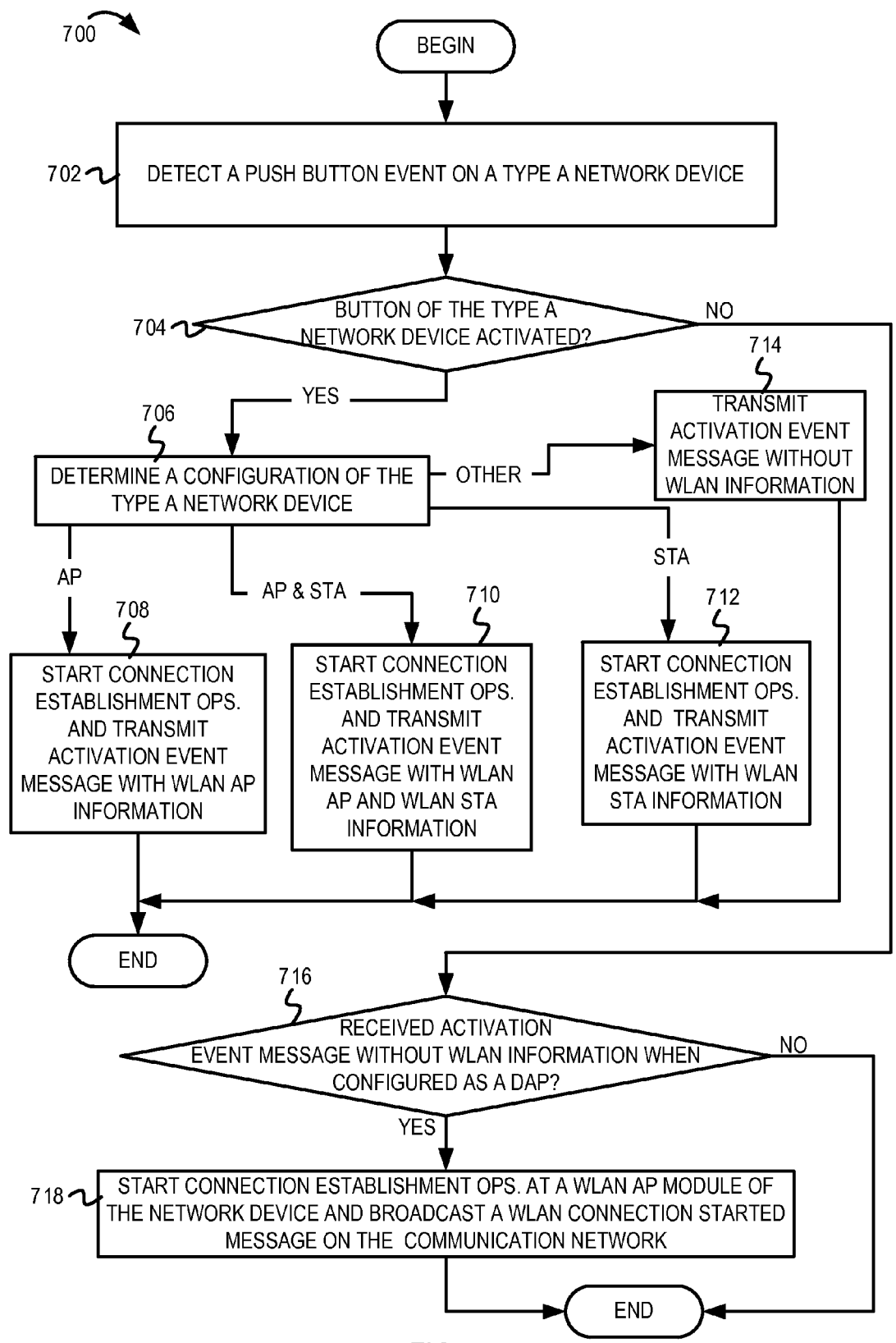
FIG. 7 is a flow diagram illustrating example operations of a type A network device in response to a push button event.
Figure 8:
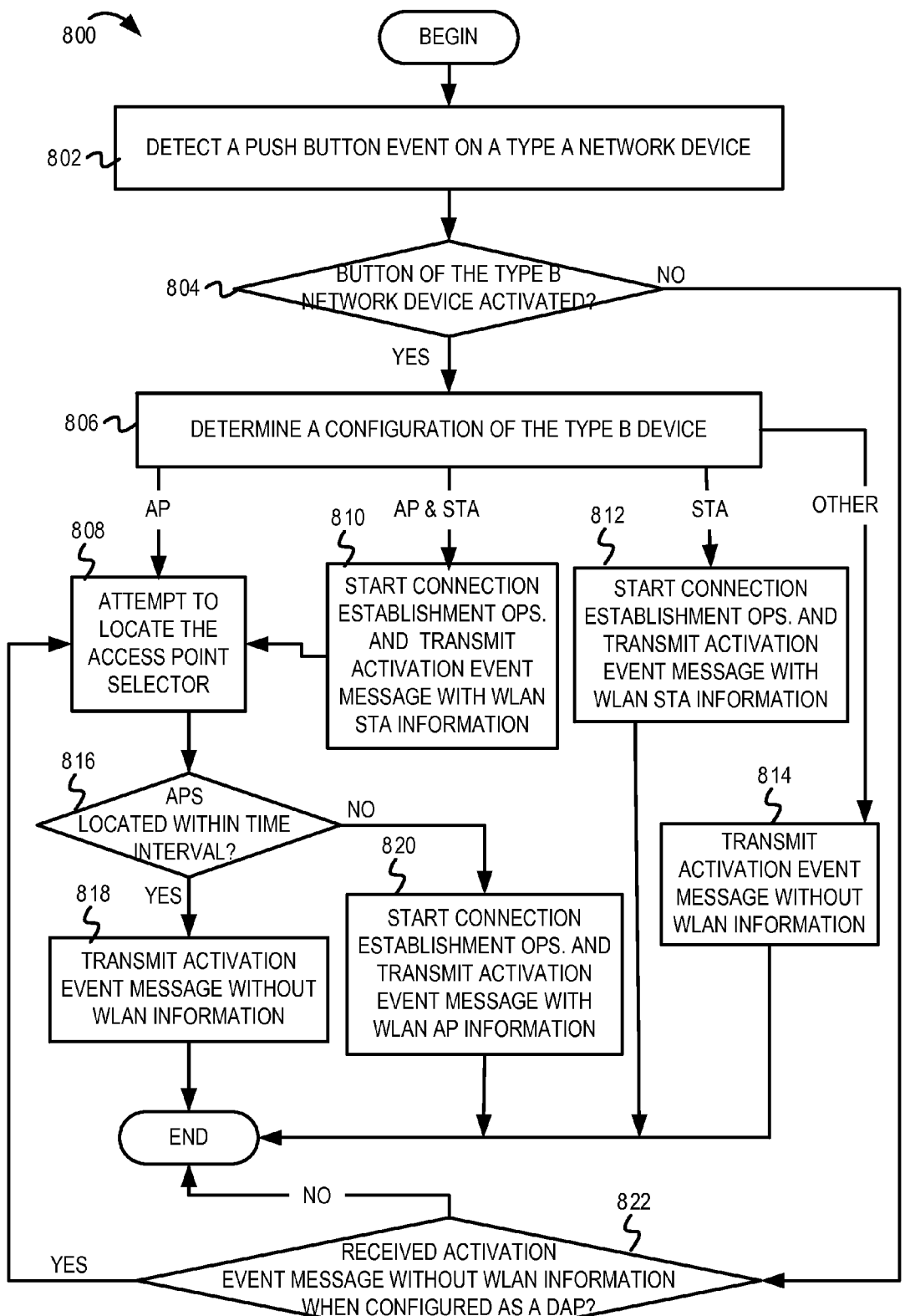
FIG. 8 is a flow diagram illustrating example operations of a type B network device in response to a push button event.
Figure 9:
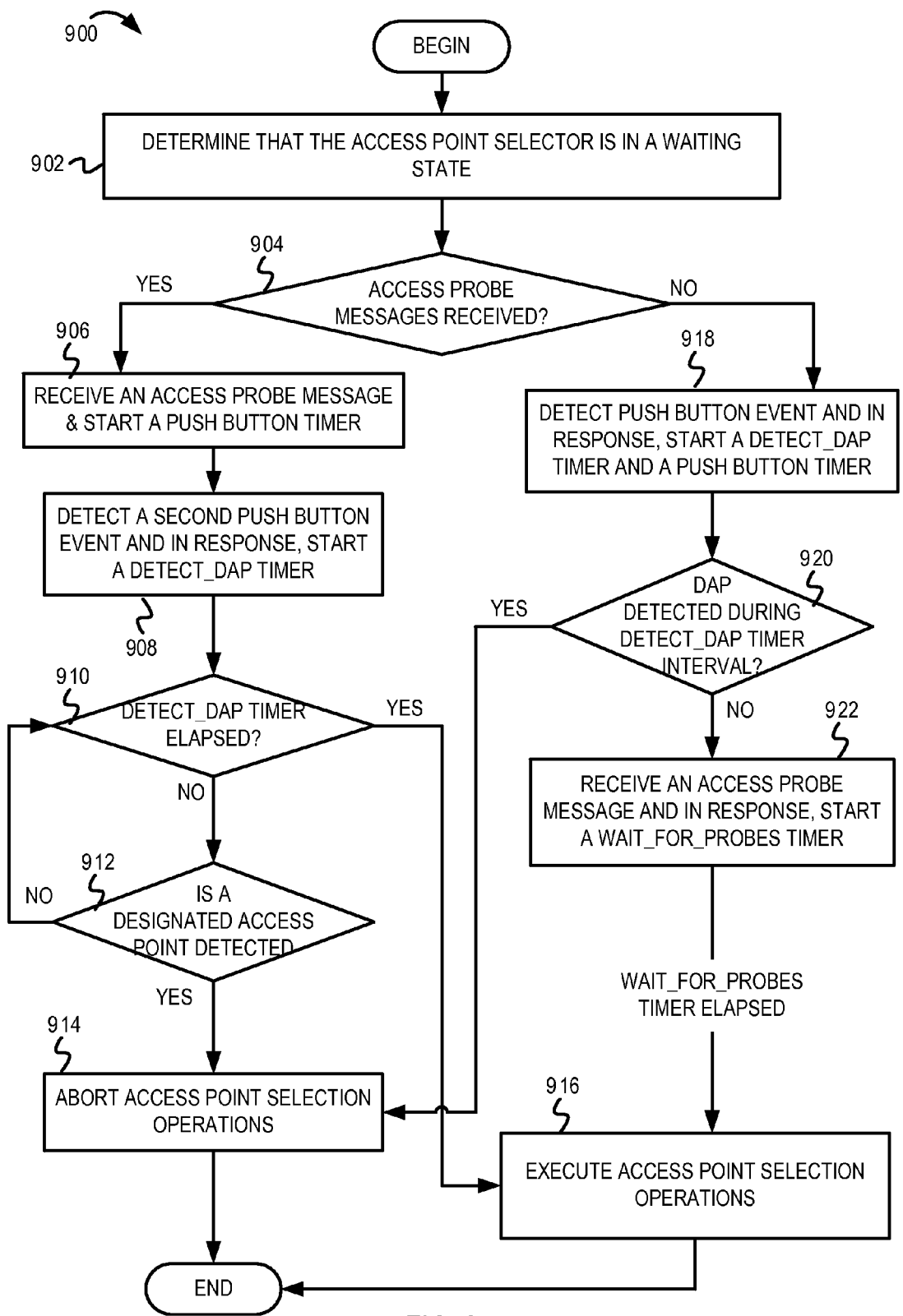
FIG. 9 is a flow diagram illustrating example operations of a type C network device.

At block 608, the first network device determines whether to establish the communication link with the second network device based, at least in part, on the device category associated with the first network device and the configuration of the first network device. Depending on the type/category to which the network device belongs (e.g., whether type A, type B, or type C) and depending on how the network device is configured (e.g., whether the network device comprises a WLAN AP module and/or a WLAN STA module), the network device can execute a different set of operations in response to a push button event. The push button event may include detecting activation of a button associated with the network device or detecting activation of a button associated with another network device of the communication network. FIGS. 7, 8, and 9 will further describe the operations of the type A, type B, and type C devices, respectively, in response to the push button event. From block 608, the flow ends.

FIG. 7 is a flow diagram 700 illustrating example operations of a type A network device in response to a push button event. The flow begins at block 702.

At block 702, a push button event is detected on a type A network device. As discussed above, the type A network device can be an IEEE Std. 1905.1 compatible device and can be configured to transmit a WLAN connection started message (e.g., broadcast or multicast message) indicating the start of the connection establishment operations with a client device and indicating that the access point selector (if any) of the communication network should abort (or not execute) the access point selection operations. The flow continues at block 704.

At block 704, it is determined whether the push button event is in response to activation of a button associated with the type A network device. In some embodiments, the push button event may indicate that a user pushed/activated the button associated with the network device. In other embodiments, the push button event may indicate that the network device received a push button event notification (PBEN) message from another in-network device. If it is determined that the button associated with the type A network device was activated, the flow continues at bock 706. Otherwise, the flow continues at block 716.

At block 706, the configuration of the type A network device is determined. The type A network device can perform different operations depending on whether the network device is configured as an access point (e.g., comprises a WLAN AP module), a client device (e.g., comprises an unassociated WLAN STA module), both an access point and a client device (e.g., comprises a WLAN AP module and an unassociated WLAN STA module), or neither an access point nor a client device (e.g., does not comprise WLAN communication capabilities or WLAN communication capabilities are disabled). Depending on the configuration of the type A network device, the flow continues at blocks 708, 710, 712, or 714. In FIG. 7, the flow continues at block 708 if the type A network device comprises a WLAN AP module; the flow continues at block 710 if the type A network device comprises a WLAN AP module and a WLAN STA module; the flow continues at block 712 if the type A network device comprises a WLAN STA module; and the flow continues at block 714 if the type A network device does not comprise a WLAN module (e.g., if the network device is a PLC device or a hybrid device that does not connect to the WLAN communication network).

At block 708, if the type A network device is configured as an access point, the WLAN AP module can initiate connection establishment operations. In other words, the WLAN AP module can start connection establishment procedures (e.g., Wi-Fi push button connection procedures defined in the WSC specification) to identify a client device with which to establish the communication link. The WLAN AP module of the type A network device can transmit an activation event message (e.g., a push button event notification (PBEN) message) including WLAN AP information (e.g., information associated with the WLAN AP module). The WLAN AP information can comprise communication capabilities of the WLAN AP module (e.g., operating communication band/channels, modulation schemes supported, etc.). The PBEN message including WLAN AP information can indicate that the button associated with the type A device was activated and that the WLAN AP module of the type A network device is currently executing connection establishment operations. Any access point selector in the communication network that detects the PBEN message comprising the WLAN AP information can abort execution of (or not execute) the access point selection operations. From block 708, the flow ends.

At block 710, if the type A network device is configured as an access point and an unassociated client device, the WLAN STA module and the WLAN AP module can each initiate the connection establishment operations. For example, the WLAN AP module can start push button connection procedures to identify a client device with which to establish a communication link, while the WLAN STA module can start the push button connection procedures to identify an access point with which to establish a communication link. An unassociated client device can be a client device that is not connected to and is not associated with any access point in the communication network. The type A network device can transmit an activation event message (e.g., a PBEN message) including the WLAN AP information and the WLAN STA information (e.g., information associated with the WLAN STA module). The WLAN STA information can comprise communication capabilities of the WLAN STA module (e.g., operating communication band/channels supported, modulation schemes supported, etc.) The PBEN message including WLAN STA information can indicate that the button associated with the type A device was activated and that the WLAN STA module of the type A network device is currently executing connection establishment operations. In one example, a type A network device that is configured as an access point and an unassociated client device may be, for example, a mobile device (client STA) that can also be operated as an access point or hotspot (access point module). From block 710, the flow ends.

At block 712, if the type A network device is configured as an unassociated client device, the WLAN STA module can initiate connection establishment operations. For example, the WLAN STA module can start the push button connection procedures (e.g., Wi-Fi push button connection procedures defined in the WSC specification) to identify an access point with which to establish the communication link. The WLAN STA module can transmit an activation event message (e.g., a PBEN message) including the WLAN STA information. From block 712, the flow ends.

At block 714, if the type A network device does not comprise a WLAN module or if the type A network device is configured in a way that is different from those listed for blocks 708, 710, and 712, the type A network device can transmit an activation event message (e.g., a PBEN message) without any WLAN information (e.g., without WLAN AP information or WLAN STA information). Transmitting the PBEN message without any WLAN information can serve as an indication that the button associated with the type A network device was activated and that the type A network device is not executing any connection establishment operations. From block 714, the flow ends.

At block 716, after it is determined that the button of the type A network device has not been activated, it is determined whether the type A network device received an activation event message without any WLAN information and whether the type A network device is configured as a designated access point (DAP). As discussed above, the PBEN message can indicate that a button of an in-network device (that transmitted the PBEN message) was activated. Receiving the activation event message (e.g., the PBEN message) that does not comprise any WLAN information can indicate that the in-network device that transmitted the PBEN message does not comprise a WLAN module (or that the WLAN module is disabled). Thus, at block 716, the type A network device can determine whether it is configured as the DAP and whether a button associated with another in-network device (that does not comprise WLAN communication capabilities) is activated. If both these conditions are satisfied, the flow continues at block 718. Otherwise, the flow ends.

At block 718, the connection establishment operations are initiated at the WLAN AP module of the network device and a WLAN connection started message is broadcast on the communication network. The flow 700 moves from block 716 to block 718 after the WLAN AP module of the type A network device determines that it is the DAP and after the WLAN AP module receives an indication that an in-network device was activated. The WLAN AP module of the type A network device can start the connection establishment procedures (e.g., Wi-Fi push button connection procedures defined in the WSC specification) to identify a client device attempting to join the communication network. The WLAN AP module can further execute the connection establishment procedures with the identified client device attempting to join the communication network. The WLAN AP module can broadcast the WLAN connection started message to preclude the access point selector (if any) of the communication network from executing the access point selection operations described in FIGS. 1-5. From block 718, the flow ends.

In some embodiments, as discussed above, the APS can attempt to locate the DAP of the communication network prior to initiating the access point selection operations. If the type A network device determines that the APS is attempting to locate the DAP of the communication network, the type A network device can transmit a suitable message (described above) to indicate that it (i.e., the WLAN AP module of the type A network device) will start the connection establishment procedures to establish a communication link with a client device. This can preclude the APS from executing the access point selection operations described in FIGS. 1-5. It is noted that in some embodiments, the DAP may not transmit the WLAN connection started message (described above at block 718) if the APS and the DAP are configured to exchange the AP-Autoconfig Search/Response messages. In other embodiments, the DAP may transmit the WLAN connection started message irrespective of whether the APS and the DAP are configured to exchange the AP-Autoconfig Search/Response messages. In other embodiments, the DAP and the APS may exchange other suitable messages to detect each other.

FIG. 8 is a flow diagram 800 illustrating example operations of a type B network device in response to a push button event. The flow begins at block 802.

At block 802, a push button event is detected on a type B network device. As discussed above, the type B network device can support the access-point selection mechanism described above in FIGS. 1-5, but the type B network device may not be configured as the access point selector. The type B network device can be configured to transmit the WLAN connection started message (e.g., broadcast or multicast message) indicating that the start of the connection establishment operations with a client device, if the type B network device cannot locate/identify the access point selector of the communication network. The flow continues at block 804.

At block 804, it is determined whether the push button event is in response to activation of a button associated with the type B network device. As discussed above with reference to block 704 of FIG. 7, the push button event may indicate that a user pushed/activated a button associated with the network device or that the network device received a PBEN message from another network device. If it is determined that the button associated with the type B network device was activated, the flow continues at bock 806. Otherwise, the flow continues at block 822.

At block 806, the configuration of the type B network device is determined. The type B network device can perform different operations depending on whether the device is configured as an access point (e.g., comprises a WLAN AP module), a client device (e.g., comprises an unassociated WLAN STA module), both an access point and a client device (e.g., comprises a WLAN AP module and an unassociated WLAN STA module), or neither an access point nor a client device (e.g., does not comprise WLAN communication capabilities or WLAN communication capabilities are disabled). Depending on the configuration of the type B network device, the flow continues at blocks 808, 810, 812, or 814. In FIG. 8, the flow continues at block 808 if the type B network device comprises a WLAN AP module; the flow continues at block 810 if the type B network device comprises a WLAN AP module and a WLAN STA module; the flow continues at block 812 if the type B network device comprises a WLAN STA module; and the flow continues at block 814 if the type B network device has an alternate configuration that does not fall into the three above device configurations (e.g., if the type B network device does not comprise a WLAN module, if the network device is a PLC device or a hybrid device that does not connect to the WLAN communication network, if the WLAN module is disabled, etc.).

At block 808, if the type B network device is configured as an access point, the WLAN AP module of the type B network device attempts to locate the access point selector in the communication network. For example, the WLAN AP module can transmit search messages to attempt to locate the access point selector. In one embodiment, the WLAN AP module can transmit an APS search message (a multicast/broadcast message) and can wait to receive an APS response message (e.g., a unicast message). The APS response message (if received) can include an identifier (e.g., a 1905.1 MAC address) of the APS. The flow continues at block 816.

At block 816, it is determined whether the access point selector could be identified within a predetermined time interval. If the access point selector could be identified within the predetermined time interval, the flow continues at block 818. Otherwise, if the predetermined time interval elapses and the access point selector could not be located, the WLAN AP module of the type B network device can determine that the communication network does not comprise an access point selector and the flow continues at block 820.

At block 818, if the access point selector was identified before the predetermined time interval elapsed, the WLAN AP module of the type B network device transmits an activation event message without any WLAN information (e.g., without WLAN AP information). Transmitting an activation event message (e.g., a PBEN message) without any WLAN information can serve as an indication that the button associated with the type B network device was activated. By transmitting the PBEN message without any WLAN information, the WLAN AP module can relinquish control to the access point selector. In other words, the WLAN AP module of the type B device may not automatically initiate the connection establishment operations. The access point selector can receive the PBEN message and can execute operations described above with reference to FIGS. 1-5 to identify another network device (if any) with which the WLAN AP module (or another access point in the communication network) should establish a communication link. From block 818, the flow ends.

At block 820, if the access point selector was not identified within the predetermined time interval, the WLAN AP module of the type B network device can initiate connection establishment operations. If the access point selector was not identified within the predetermined time interval, the WLAN AP module can infer that the communication network does not comprise an access point selector. If the access point selector was not identified within the predetermined time interval, the WLAN AP module can start connection establishment procedures (e.g., Wi-Fi push button connection procedures defined in the WSC specification) to identify a client device with which to establish the communication link. The WLAN AP module can transmit the activation event message (e.g., the PBEN message) including WLAN AP information. The WLAN AP information can comprise communication capabilities of the WLAN AP module (e.g., operating communication band/channels, modulation schemes supported, etc.). The PBEN message including WLAN AP information can indicate that the button associated with the type B device was activated and that the WLAN AP module of the type B network device is currently executing connection establishment operations. Any access point selector in the communication network that detects the PBEN message comprising the WLAN AP information can abort execution of (or not execute) the access point selection operations. From block 820, the flow ends.

At block 810, if the type B network device is configured as an access point and an unassociated client device, the unassociated WLAN STA module of the type B network device can initiate the connection establishment operations. For example, the WLAN STA module can start push button connection procedures to identify an access point with which to establish a communication link. The WLAN STA module can transmit an activation event message (e.g., a PBEN message) including the WLAN STA information. The WLAN STA information can comprise communication capabilities of the WLAN STA module (e.g., operating communication band/channels supported, modulation schemes supported, etc.). The PBEN message including WLAN STA information can indicate that the button associated with the type B device was activated and that the WLAN STA module of the type B network device is currently executing connection establishment operations. From block 810, the flow continues at block 808, where the WLAN AP module of the type B network device can attempt to locate the access point selector of the communication network, as described above with reference to blocks 808, 816, 818, and 820.

At block 812, if the type B network device is configured as an unassociated client device, the WLAN STA module of the type B network device can initiate connection establishment operations. In other words, the WLAN STA module can start the connection establishment procedures (e.g., Wi-Fi push button connection procedures defined in the WSC specification) to identify an access point with which to establish the communication link. The WLAN STA module can transmit an activation event message (e.g., a PBEN message) including the WLAN STA information. From block 812, the flow ends.

At block 814, if the type B network device does not comprise a WLAN module or if the type B network device is configured in a way that is different from those listed for blocks 808, 810, and 812, the type B network device can transmit an activation event message (e.g., a PBEN message) without any WLAN information (e.g., without WLAN AP information or WLAN STA information). Transmitting the PBEN message without any WLAN information can serve as an indication that the button associated with the type B network device was activated. From block 814, the flow ends.

At block 822, after it is determined that a button of the network device has not been activated, it is determined whether the type B network device received an activation event message without any WLAN information and whether the type B network device is configured as a designated access point (DAP). As discussed above, the activation event message (e.g., the PBEN message) can indicate that a button of an in-network device was activated. Receiving the PBEN message that does not comprise any WLAN information can indicate that the in-network device that transmitted the PBEN message does not comprise a WLAN module (or that the WLAN module is disabled). Thus, at block 822, the type B network device can determine whether it is configured as the DAP and whether a button associated with another in-network device (that does not comprise WLAN communication capabilities) is activated. If both these conditions are satisfied, the flow loops back to block 808, where the WLAN AP module of the type B network device can attempt to locate the access point selector of the communication network as discussed above with reference to blocks 808, 816, 818, and 820. Otherwise, if the type B network device has not received a PBEN message without WLAN information and/or if the WLAN type B network device is not configured as a designated access point (DAP), the flow ends.

FIG. 9 is a flow diagram 900 illustrating example operations of a type C network device. As discussed above, the type C network device supports the access point selection mechanism and is configured as an access point selector. It is noted that the type C network device that is configured as an access point selector may or may not be an access point. The flow 900 begins at block 902.

At block 902, it is determined that the access point selector is in a waiting state. The access point selector (i.e., the type C network device) may execute different operations depending on the first message received at the access point selector while the access point selector is in the waiting state (also referred to the inactive state 502 of FIG. 5). For example, the access point selector can execute one set of operations (described in blocks 918-922, 914, and 916), if the access point selector receives the PBEN message (without WLAN information or with WLAN STA information) or if the button associated with the access point selector was activated before receiving the access probe messages. In other words, the access point selector can execute the operations described in blocks 918-922, 914, and 916 if the button of an in-network device is activated before the button associated with a client device (attempting to join the communication network) is activated. Alternately, the access point selector can execute a second set of operations (described in blocks 906-916) if the access point selector receives access probe messages (e.g., if the button associated with before the button associated with the access point selector is activated or before receiving a PBEN message (without WLAN information or with WLAN STA information). In other words, the access point selector can execute the operations described in blocks 906-916 if the button associated with the client device (attempting to join the communication network) is activated before the button associated with an in-network device is activated. The flow continues at block 904.

At block 904, it is determined whether the access point selector received an access probe message. As discussed above with reference to FIGS. 1-5, a client device attempting to join the communication network may broadcast a probe request message. One or more access points in the communication network may detect the probe request message. The access points may each provide a notification (also referred to as the access probe message) to the access point selector indicating that they detected the probe request message. Receiving the access probe messages can indicate that a button associated with a client device (attempting to join the communication network) was activated. If it is determined that the access point selector has not received any probe messages, the access point selector can infer that it received the PBEN message (without WLAN information or with WLAN STA information) or detected that the button of the access point selector was activated. In other words, if the access point selector has not received any probe messages, the access point selector can infer that the button associated with an in-network device was activated. If it is determined that the access point selector received the access probe messages, the flow continues at block 906. Otherwise, the flow continues at block 918.

At block 906, in response to determining that the access point selector received the access probe messages, the access point selector starts a push button timer. The access point selector can wait for the time interval indicated in the push button timer (also referred to the push button time interval 224 of FIGS. 3-5) to receive a "second push button event." The second push button event can include receiving the PBEN message without WLAN information, receiving the PBEN message with WLAN STA information, or detecting that the button associated with the access point selector was activated. As discussed above, receiving the PBEN message without WLAN information can indicate that a button of an in-network device without WLAN communication capabilities was activated. Also, as discussed above, receiving the PBEN message with WLAN STA information can indicate that a button of an in-network device that comprises a WLAN client module was activated. In other words, at block 906, the access point selector determines that the button associated with the client device attempting to join the communication network was activated and waits for the button associated with an in-network device to be activated. In some embodiments, the time interval for which the access point selector waits to receive the second push button event (i.e., the duration of the push button timer) can be 2 minutes. In other embodiments, the duration of the push button timer can be configurable and may be implementation-specific. The flow continues at block 908.

At block 908, the second push button event is detected and a detect_DAP timer is started. For example, after receiving the access probe messages, the access point selector may receive the PBEN message without WLAN information, may receive the PBEN message with WLAN STA information, or may detect that the button associated with the access point selector has been activated. In other words, the access point selector determines that the button associated with the client device attempting to join the communication network and the button associated with an in-network device were both activated. Consequently, the access point selector can start a time interval ("detect_DAP timer") during which the access point selector can determine whether the communication network comprises a designated access point (DAP). In some embodiments, the access point selector can passively wait to detect the DAP. As discussed above, the access point selector may wait to receive a WLAN connection started message or a PBEN message with AP parameters from the DAP. In this embodiment, the value of the detect_DAP timer can be configured to account for delays that may be incurred when a PBEN message without WLAN parameters is transmitted from a network device, the DAP receives the PBEN message without WLAN parameters, the DAP starts the connection establishment operations and sends the WLAN connection started message, the APS receives the WLAN connection started message, and/or other suitable delays and network considerations. In some embodiments, the access point selector may be configured to actively search for the DAP of the communication network using the AP-Autoconfig Search/Response messages. The APS can indicate (e.g., in an AP-Autoconfig Search message) that it is attempting to locate the DAP of the communication network. The access point selector can then wait to receive an appropriate response message (e.g., an AP-Autoconfig Response message) from the DAP. In this embodiment, the duration of the detect_DAP timer (initiated at the APS) may take into consideration the delays incurred when the access point selector sends the AP-Autoconfig Search message to search for DAP, the DAP receives the AP-Autoconfig Search message and responds with an AP-Autoconfig Response message, and the access point selector receives the AP-Autoconfig Response message. It is noted, however, that the access point selector and the DAP can use any suitable mechanism to detect/indicate the presence of the DAP in the communication network. The flow continues at block 910.

At block 910, it is determined whether the detect_DAP timer has elapsed. If the access point selector determines that the detect_DAP timer has not elapsed, the flow continues at block 912. Otherwise, if it is determined that the detect_DAP timer has elapsed, the flow continues at block 916.

At block 912, it is determined whether a designated access point was detected in the communication network. While the detect_DAP timer is running, the access point selector can determine whether it has received any notifications that indicate the presence of the designated access point. For example, if the access point selector receives a PBEN message with WLAN AP information or if the access point selector receives a WLAN connection started message, this can indicate that the communication network comprises a designated access point. As another example, if the access point selector receives an appropriate AP-Autoconfig Response message, this can indicate that the communication network comprises a designated access point. As another example, if the access point selector detects the presence of a type A network device configured as a DAP, this can indicate that the communication network comprises a designated access point. If a designated access point was detected in the communication network, the flow continues at block 914. Otherwise, the flow loops back to block 910, where the access point selector continues to wait until the detect_DAP timer expires.

At block 914, if a designated access point is detected, the access point selector aborts access point selection operations. In some embodiments, the designated access point may have a preferred priority as compared to the access point selector. For example, the designated access point may have a higher priority as compared to the access point selector. Therefore, if the access point selector detects the presence of the designated access point, the access point selector can relinquish control to the designated access point and can abort (or not execute) operations for selecting which access point should establish a communication link with a client device (as described above in FIGS. 1-5). From block 914, the flow ends.

At block 916, after the detect_DAP timer elapses, the access point selector executes access point selection operations if the communication network does not comprise a designated access point. If the communication network does not comprise a designated access point, the access point selector can determine which access point should execute connection establishment operations with a client device attempting to join the communication network, as described above with reference to FIGS. 1-5. From block 916, the flow ends.

At block 918, in response to determining that the access point selector did not receive any access probe messages, the access point selector starts a detect_DAP timer and a push button timer. More specifically, while in the waiting state of block 902, the access point selector may determine that a button associated with an in-network device has been activated. In one embodiment, the access point selector may receive a PBEN message without WLAN information, may receive the PBEN message with WLAN STA information, or may detect that a button associated with the access point selector has been activated. If the access point selector does not receive any access probe messages, the access point selector can infer that a button associated with a client device attempting to join the communication network has not been activated. In response, the access point selector can start a detect_DAP timer and a push button timer and can wait to receive the access probe messages (e.g., can wait to detect a client device attempting to join the communication network). The access point selector can wait to receive the access probe messages for the duration of the push button timer, while the access point selector can attempt to detect the designated access point for the duration of the detect_DAP timer. In some embodiments, the time interval for which the access point selector waits to receive at least a first access probe message (i.e., the duration of the push button timer) can be 2 minutes. In other embodiments, the duration of the push button timer can be configurable and may be implementation-specific. The flow continues at block 920.

At block 920, it is determined whether the designated access point was detected during the detect_DAP timer interval. As discussed above with reference to blocks 910 and 912, the access point selector can determine whether the communication network also comprises a designated access point. The access point selector may passively attempt to locate the DAP (e.g., by waiting for the WLAN connection started message or the PBEN message with WLAN AP information) and/or may actively attempt to locate the DAP (e.g., by transmitting the AP-Autoconfig Search message). If the communication network comprises a designated access point, the flow continues at block 914, where the access point selector aborts subsequent access point selection operations and the flow ends. If the communication network does not comprise a designated access point, the flow continues at block 922.

At block 922, an access probe message is received and in response, a wait_for_probes timer is initiated. After the access point selector determines that the communication network does not comprise a designated access point and after the detect_DAP timer elapses, the access point selector can continue to wait (for the wait time interval) to receive the access probe messages. In response to receiving the first access probe message, the access point selector can start the wait_for_probes timer. The time interval for which the access point selector waits to receive subsequent access probe messages (i.e., the duration of the wait_for_probes timer) can be configurable and may be implementation-specific. After the wait_for_probes timer elapses, the flow continues at block 916 where the access point selector can select an access point (based on the received access probe messages) that should execute connection establishment operations with a client device of the communication network, as described above with reference to FIGS. 1-5.

Although not depicted in FIG. 9, it is noted that in some embodiments, the push button timer elapses before the button of the access point selector is activated or before the button of the client device attempting to join the communication network is activated (e.g., before the PBEN message (without WLAN information or with WLAN STA information) is received). In this embodiment, the access point selector can switch to the waiting/pending state at block 902. It is also noted that in some embodiments, the access point selector can start the connection establishment procedures (e.g., the Wi-Fi push button connection procedures) if the push button timer elapses and the access point selector has not received any access probe messages.

It is noted that if the type C network device also comprises an unassociated client device (e.g., an unassociated WLAN STA module), then in response to detecting the push button event, the WLAN STA module can initiate connection establishment operations. In other words, the WLAN STA module of the type C network device (i.e., the access point selector) can start connection establishment procedures (e.g., Wi-Fi push button connection procedures defined in the WSC specification) to identify an access point with which to establish the communication link. The WLAN STA module can transmit a PBEN message including the WLAN STA information. In some embodiments, the access point selector module (e.g., WLAN AP module) of the type C network device may receive a probe request message from its own WLAN STA module. In this embodiment, the probe request message can be internally relayed (e.g., without transmitting/receiving the message via the WLAN communication medium) to the access point selector module of the type C network device.

Furthermore, in some embodiments, a sequence of operations that is different from the operations described in FIG. 9 may be executed. For example, in some embodiments, the operations of block 922 may not be executed. Specifically, the access point selector may not initiate the wait_for_probes time interval and may not wait to receive subsequent access probe messages after receiving the first access probe message. As another example, the access point selector may attempt to identify the DAP of the communication network (e.g., may execute the operations of blocks 912 and 920) when the access point selector joins the communication network and/or when network devices are added to the communication network.

It is noted that although FIGS. 6-9 describe connection establishment and device configuration operations being executed in response to activating a button associated with the client device 108 and/or activating a button associated with an in-network device, embodiments are not so limited. In other embodiments, the connection establishment and device configuration operations can be executed in response to activation of other suitable triggers (e.g., a switching device) associated with the client device 108 and/or the in-network device.

It should be understood that FIGS. 1-9 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. Although examples describe a user activating a button associated with an in-network device such as an access point or an access point selector, embodiments are not so limited. In other embodiments, the user can activate a button associated with other suitable in-network devices. For example, a push button (e.g., an IEEE Std. 1905.1 button) can be implemented on a smartphone, a tablet, a mobile phone, a laptop computer, or other suitable electronic device that can connect to the hybrid communication network (e.g., the IEEE Std. 1905.1 network). In response to detecting that the push button was activated, the smartphone (or other suitable electronic device) can inject a push button event notification message (e.g., an IEEE Std. 1905.1 PBEN message) via its WLAN interface. Alternately, if a button associated with a PLC device is activated (e.g., or another device that does not have a WLAN interface), the PLC device can inject a PBEN message via its PLC interface. The PBEN message can be broadcast to other hybrid devices, bridging devices, etc. and eventually relayed to the access point selector 106.

Although FIG. 3 depicts the access point selector 106 only notifying the selected access point 104 to initiate the connection establishment procedures with the client device 108, embodiments are not so limited. In other embodiments, after the access point selector 106 determines that the access point 104 should initiate the connection establishment operations with the client device 108, the access point selector 106 can also transmit a notification to the other access point 102 indicating that it should not execute connection establishment procedures with the client device 108.

In some embodiments, after the access point selector 106 receives a first access probe message 408 from the access point 102, the access point selector 106 may not wait to receive additional access probe messages. Instead, the access point selector 106 may automatically notify the access point 102 (that transmitted the first access probe message 408) to initiate the connection establishment operations (e.g., push button connection procedures) with the client device 108. In other embodiments, the access point selector 106 can wait for an additional time interval (e.g., 5 seconds) after receiving the first access probe message to receive additional access probe messages from other access points, as depicted in FIG. 4.

In some embodiments, the access point selector 106 may also be an access point and may receive a probe request message from the client device 108. In this embodiment, the access point selector 106 may determine whether it (i.e., the access point selector 106), the access point 102, or the access point 104 should execute the connection establishment procedures with the client device 108. In one example, if the access point selector 106 received the probe request message (from the client device 108) with the highest signal strength, the access point selector 106 can determine that it (i.e., the access point selector 106) should execute the connection establishment procedures with the client device 108.

Although FIGS. 6-9 describe the push button event notification (PBEN) messages comprising WLAN AP information, WLAN STA information, and/or no WLAN information, in other embodiments the PBEN message may comprise other non-WLAN information (e.g., information associated with other communication media, management information, etc.).

It is noted that although examples describe the connection establishment and configuration operations being executed in response to a button associated with a client device being activated and/or a button associated with an in-network device being activated, embodiments are not so limited. In other embodiments, the connection establishment and configuration operations described herein can be initiated in response to the activation of any suitable trigger of the client device and/or any suitable trigger of the in-network device. For example, the trigger may be a switching device. The connection establishment and configuration operations may be initiated in response to detecting activation of a switching device associated with the client device and/or in response to detecting activation of a switching device associated with an in-network device. It is further noted that although the operations described herein as executed in response to a user activating a trigger (e.g., a button) associated with a client device and/or an in-network device, embodiments are not so limited. In other embodiments, the trigger associated with the client device and/or an in-network device can be activated using other suitable mechanisms or in response to other suitable events. For example, the trigger can be activated in response to a control signal from another suitable coordinating/controlling device.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
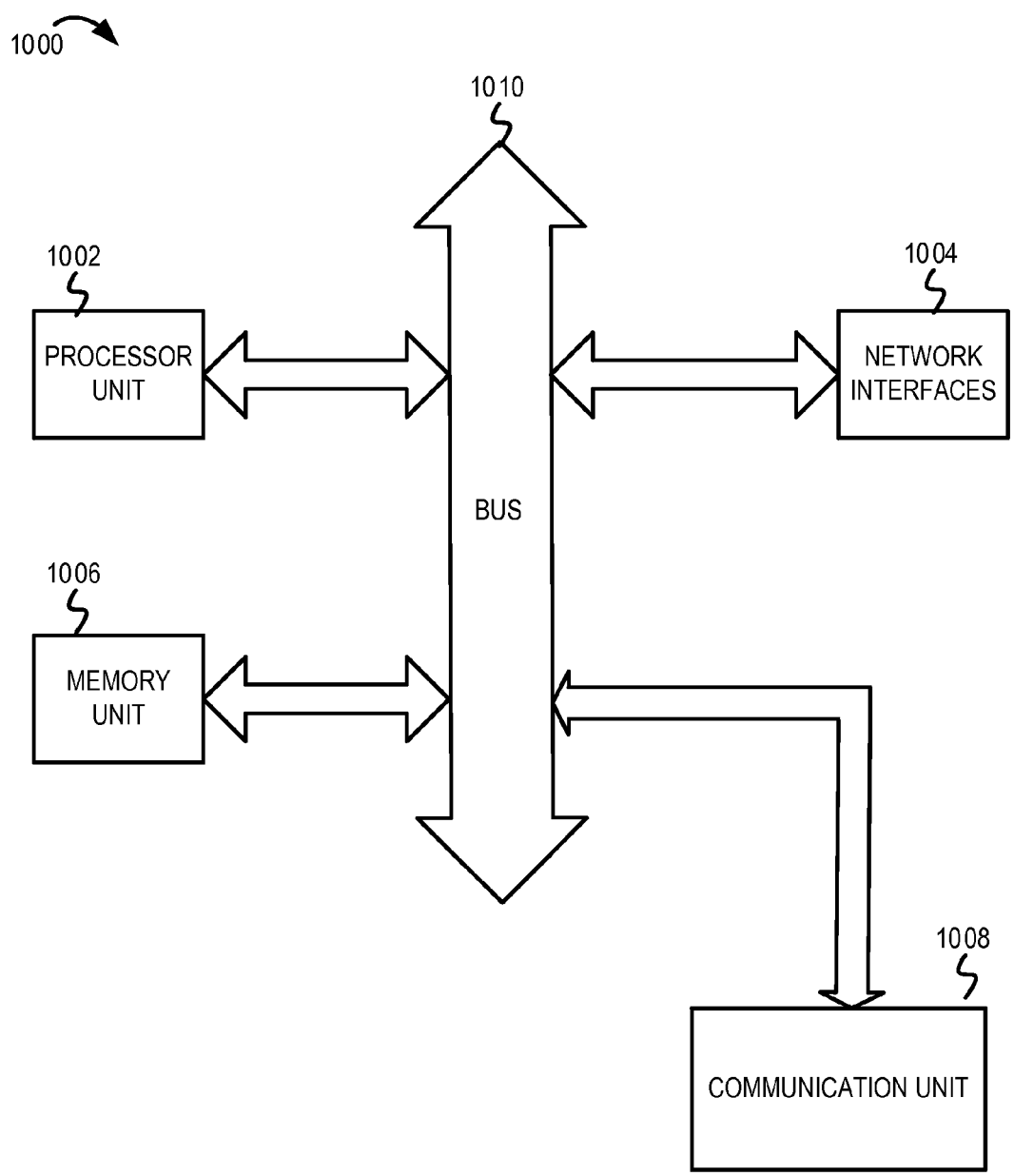
FIG. 10 is a block diagram of one embodiment of an electronic device including a mechanism for selecting an access point to establish a communication link.

FIG. 10 is a block diagram of one embodiment of an electronic device 1000 including a mechanism for selecting an access point to establish a communication link. In some implementations, the electronic device 1000 may be one of a desktop computer, laptop computer, a tablet computer, a mobile phone, a smart appliance, a powerline communication device, a network bridging device, an access point, or other electronic system comprising a hybrid communication unit configured to communicate across multiple communication networks. In other implementations, the electronic device 1000 may be a standalone WLAN device. The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1010 (e.g., PCI, ISA, PCI-Express, HyperTransport®, InfiniBand®, NuBus, AHB, AXI, etc.), and network interfaces 1004 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.). In some implementations, the electronic device 1000 can comprise a plurality of network interfaces—each of which couples the electronic device 1000 to a different communication network. For example, the electronic device 1000 can comprise a PLC interface, an Ethernet interface, and a WLAN interface that couple the electronic device 1000 with a powerline communication network, an Ethernet, and a wireless local area network respectively. Furthermore, the electronic device 1000 can execute an IEEE Std. 1905.1 protocol for implementing hybrid communication functionality.

The electronic device 1000 also includes a communication unit 1008. In some embodiments, the electronic device 1000 can be configured as an access point. In this embodiment, the communication unit 1008 can detect a probe request message from a client device attempting to join a communication network. In response to detecting the probe request message, the electronic device 1000 (i.e., the access point) can transmit a notification (e.g., an access probe message) to an access point selector indicating that a request for executing connection establishment procedures (e.g., push button connection procedures) was received from the client device. In another embodiment, the electronic device 1000 can be configured as the access point selector. In this embodiment, the electronic device 1000 (i.e., the access point selector) can receive access probe messages from corresponding access points and can select one of the access points that should execute the connection establishment procedures with the client device, as described above in FIGS. 1-5. The access point selector can also execute operations described above in FIG. 9 to determine whether the communication network comprises a designated access point and if so, to relinquish control to the designated access point. In another embodiment, the electronic device 1000 can be an access point and an access point selector and can determine whether it (the access point selector) should execute the connection establishment procedures with the client device. In another embodiment, the electronic device 1000 can be a network device configured as an access point and/or a client device. The electronic device 1000 can execute operations to either relinquish control to the access point selector or to notify the access point selector to abort access point selection operations, as described above in FIGS. 7-8.

Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 10 (e.g., video cards, audio cards, additional network interfaces, peripheral devices, etc.). For example, the communication unit 1008 may comprise one or more processor units distinct from the processor unit 1002. The processor unit 1002, the memory unit 1006, and the network interfaces 1004 are coupled to the bus 1010. Although illustrated as being coupled to the bus 1010, the memory unit 1006 may be coupled to the processor unit 1002.

While the embodiments are described with reference to various implementations and exploitations, it will be understood that these embodiments are illustrative and that the scope of the inventive subject matter is not limited to them. In general, techniques for device configuration in a hybrid communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for network communication, the method comprising:
   receiving, at an access point selector of a communication network, a first notification from one of a plurality of access points in the communication network for establishing a communication link with a client device, wherein the plurality of access points comprise the access point selector;
   determining that a first trigger associated with the client device and a second trigger associated with a network device of the communication network are each activated within a first time interval;
   determining, during a second time interval, whether the communication network comprises a designated access point;
   in response to determining that the communication network does not comprise the designated access point,
      determining that a first access point of the plurality of access points should establish the communication link based, at least in part, on the first notification and on said determining that the first trigger and the second trigger are each activated within the first time interval, and
      notifying the first access point to establish the communication link; and
   in response to determining that the communication network comprises the designated access point, aborting operations for determining which of the plurality of access points should establish the communication link with the client device.

2. The method of claim 1, wherein the access point selector, the plurality of access points, and the client device are Institute of Electrical and Electronics Engineers (IEEE) 1905.1 compatible devices.

3. The method of claim 1, wherein, the first notification comprises:
   a first identifier associated with the first access point,
   a second identifier associated with the client device,
   a first indication of at least one communication capability of the first access point,
   a second indication of at least one communication capability of the client device, and
   a third indication of a signal strength associated with a probe request message received from the client device at the first access point.

4. The method of claim 1, wherein said receiving the first notification is in response to activation of the first trigger.

5. The method of claim 1, further comprising:
   determining whether the first trigger is activated prior to activation of the second trigger; or
   determining whether the second trigger is activated prior to activation of the first trigger.

6. The method of claim 1, wherein the network device is the access point selector or the first access point.

7. The method of claim 1, further comprising:
   determining whether the first notification was received during the first time interval and prior to activation of the second trigger, wherein
      said determination that the first trigger is activated within the first time interval is in response that the first notification was received during the first time interval and prior to the activation of the second trigger.

8. The method of claim 1, wherein said determining that the first access point should establish the communication link comprises:
   comparing a plurality of signal strength indicators received from the plurality of access points, wherein each of the plurality of signal strength indicators indicates a signal strength of a respective probe request message received at a respective one of the plurality of access points from the client device;
   determining that the first access point is associated with a first of the plurality of signal strength indicators; and
   determining that the first access point should establish the communication link in response to said determining that the first access point is associated with the first of the plurality of signal strength indicators.

9. The method of claim 1, wherein said notifying the first access point to establish the communication link further comprises:
   initiating a timer indicating an elapsed time used to compare to a third time interval, wherein the third time interval indicates an interval of time during which the first access point should establish the communication link.

10. The method of claim 9, further comprising:
    determining that the second trigger is activated one more time;
    determining that the elapsed time is less than the third time interval;
    determining that the first access point was previously selected to establish the communication link;
    notifying, one more time, the first access point to establish the communication link; and
    re-starting the timer.

11. The method of claim 1, further comprising:
    initiating a timer within the first time interval in response to at least one member of the group consisting of:
       said receiving the first notification,
       said determining that the first trigger is activated, and
       said determining that the second trigger is activated, wherein
          the timer indicates an elapsed time that is compared to the second time interval when detecting the designated access point.

12. The method of claim 1, wherein said determining, during the second time interval, whether the communication network comprises the designated access point comprises:
    determining whether a second notification was received at the access point selector from the designated access point, wherein the second notification indicates that the designated access point is executing connection establishment procedures to establish the communication link.

13. The method of claim 1, wherein said determining, during the second time interval, whether the communication network comprises the designated access point comprises:
    broadcasting a first message from the access point selector to identify the designated access point; and determining whether a second message indicating a presence of the designated access point was received at the access point selector during the second time interval.

14. A method for network communication, the method comprising:
receiving, at an access point selector of a communication network, a first notification from one of a plurality of access points in the communication network for establishing a communication link with a client device;
determining that a first trigger associated with the client device and a second trigger associated with a network device of the communication network are each activated within a first time interval;
determining, during a second time interval that is initiated within the first time interval, whether the communication network comprises a designated access point;
in response to determining that the communication network does not comprise the designated access point,
determining that a first access point of the plurality of access points should establish the communication link based, at least in part, on the first notification and on said determining that the first trigger and the second trigger are each activated within the first time interval; and
notifying the first access point to establish the communication link.

15. The method of claim 14, wherein
in response to determining that the communication network comprises the designated access point, the method further comprises:
aborting operations for determining which of the plurality of access points should establish the communication link.

16. The method of claim 14, wherein the access point selector is one of the plurality of access points.

17. The method of claim 14, wherein said receiving the first notification is in response to activation of the first trigger.

18. The method of claim 14, wherein the network device is:
the access point selector or
the first access point.

19. The method of claim 14, further comprising:
determining whether the first notification was received during the first time interval and prior to activation of the second trigger;
in response to determining that the first notification was received during the first time interval and prior to the activation of the second trigger,
performing said determination the first trigger is activated within the first time interval.

20. The method of claim 14, wherein said determining that the first access point should establish the communication link comprises:
comparing a plurality of signal strength indicators received from the plurality of access points, wherein the each of the plurality of signal strength indicators indicates a signal strength of a respective probe request message received at a respective one of the plurality of access points from the client device;
determining that the first access point is associated with a first of the plurality of signal strength indicators; and
determining that the first access point should establish the communication link in response to said determining that the first access point is associated with the first of the plurality of signal strength indicators.

21. The method of claim 14, wherein said determining, during the second time interval, whether the communication network comprises the designated access point further comprises:
determining whether a second notification was received at the access point selector from the designated access point, wherein the second notification indicates that the designated access point is executing connection establishment procedures to establish the communication link.

22. The method of claim 14, wherein said determining, during the second time interval, whether the communication network comprises the designated access point comprises:
broadcasting a first message from the access point selector to identify the designated access point; and
determining whether a second message indicating a presence of the designated access point was received at the access point selector during the second time interval.

23. The method of claim 14, wherein said receiving the first notification comprises:
initiating a third time interval at the access point selector for receiving a second notification from another one of the plurality of access points.

24. A method for network communication, the method comprising:
determining, by a first network device of a communication network, that a trigger associated with the first network device is activated for establishing a communication link with a second network device of the communication network;
determining a device category associated with the first network device and a configuration of the first network device; and
initiating, by the first network device, connection establishment procedures to establish the communication link with the second network device based, at least in part, on the device category and the configuration, wherein the configuration indicates whether the first network device comprises an access point module and whether the first network device comprises an unassociated client module.

25. The method of claim 24, wherein when the first network device is associated with a first device category, the first network device is configured to transmit a first notification message that indicates a start of the connection establishment procedures and that notifies an access point selector of the communication network to stop executing access point selection operations.

26. The method of claim 24, wherein
when the first network device is associated with a second device category, the first network device is configured to locate an access point selector, wherein when the access point selector cannot be located, the first network device is further configured to transmit a second notification message that indicates a start of the connection establishment procedures; and
when the first network device is associated with a third device category, the first network device is configured as the access point selector and is configured to select another access point for executing the connection establishment procedures.

27. The method of claim 24, wherein ,
in response to the configuration indicating that the first network device comprises the access point module,
executing the connection establishment procedures to identify the second network device with which to establish the communication link, wherein the second network device is an unassociated client device attempting to join the communication network; and transmitting an activation event message including access point module information.

28. The method of claim 27, wherein said transmitting the activation event message including the access point module information enables an access point selector of the communication network to detect a designated access point and stop executing access point selection operations.

29. The method of claim 24, wherein,
when the configuration indicates that the first network device does not comprise the access point module or the unassociated client module,
broadcasting an activation event message without access point module information and without client module information.

30. The method of claim 24, wherein, when the configuration indicates that the first network device comprises the access point module and when the first network device is associated with a first device category,
determining that the access point module of the first network device is configured as a designated access point of the communication network;
executing the connection establishment procedures to,
identify the second network device attempting to join the communication network, and
establish the communication link; and
transmitting a notification message via the communication network to indicate that the first network device is the designated access point of the communication network and that the first network device is executing the connection establishment procedures to establish the communication link.

31. The method of claim 30, wherein the notification message is a wireless local area network (WLAN) connection started message, and wherein said transmitting the notification message enables an access point selector of the communication network to detect the designated access point and stop executing access point selection operations.

32. The method of claim 30, further comprising:
receiving, at the first network device, a first message for identifying the designated access point in the communication network from an access point selector; and
transmitting, to the access point selector, a second message indicating that the first network device is the designated access point.

33. The method of claim 24, wherein,
when the configuration indicates that the first network device comprises the access point module,
determining whether an access point selector of the communication network can be identified within a time interval;
in response to identifying the access point selector within the time interval, transmitting an activation event message without access point module information.

34. The method of claim 33, further comprising:
receiving, from a third network device of the communication network, the activation event message without client module information and without the access point module information associated with the third network device;
determining that the access point module of the first network device is configured as a designated access point of the communication network; and
determining whether the access point selector can be identified within the time interval, in response to said determining that the access point module is configured as the designated access point and in response to receiving the activation event message from the third network device.

35. An access point selector comprising:
a processor; and
a communication unit coupled with the processor, the communication unit configured to:
receive a notification from one of a plurality of access points in a communication network for establishing a communication link with a client device, wherein the plurality of access points comprise the access point selector;
determine that a first trigger associated with the client device and a second trigger associated with a network device of the communication network are each activated within a first time interval;
determine, during a second time interval, whether the communication network comprises a designated access point;
in response to determining that the communication network does not comprise the designated access point,
determine that a first access point of the plurality of access points should establish the communication link based, at least in part, on the notification and on the communication unit determining that the first trigger and the second trigger are each activated within the first time interval, and
notify the first access point to establish the communication link; and
in response to determining that the communication network comprises the designated access point, aborting operations for determining which of the plurality of access points should establish the communication link with the client device.

36. The access point selector of claim 35, wherein the communication unit is further configured to:
receive, at the access point selector, a first notification from one of the plurality of access points for establishing the communication link with the client device,
determine whether the notification was received during the first time interval and prior to activation of the second trigger, wherein
the communication unit is configured to determine that the first trigger is activated within the first time interval in response that the first notification was received during the first time interval and prior to the activation of the second trigger.

37. The access point selector of claim 35, wherein the communication unit configured to determine that the first access point should establish the communication link comprises the communication unit configured to:
compare a plurality of signal strength indicators received from the plurality of access points, wherein each of the plurality of signal strength indicators indicates a signal strength of a respective probe request message received at a respective one of the plurality of access points from the client device;
determine that the first access point is associated with a first of the plurality of signal strength indicators; and
determine that the first access point should establish the communication link in response to determining that the first access point is associated with the first of the plurality of signal strength indicators.

38. The access point selector of claim 35, wherein the communication unit is further configured to:

determine that the second trigger is activated one more time;

determine that an elapsed time is less than a third time interval, wherein the third time interval indicates an interval of time during which the first access point executes connection establishment procedures and establishes the communication link;

determine that the first access point was previously selected to establish the communication link;

notify, for one more time, the first access point to establish the communication link; and re-start a timer indicating the elapsed time.

39. A first network device comprising:
a processor; and
a communication unit coupled with the processor, the communication unit configured to:
  determine that a trigger associated with the first network device of a communication network is activated for establishing a communication link with a second network device of the communication network;
  determine a device category associated with the first network device and a configuration of the first network device; and
  initiate connection establishment procedures to establish the communication link with the second network device based, at least in part, on the device category associated with the first network device and the configuration of the first network device, wherein the configuration of the first network device indicates whether the first network device comprises an access point module and whether the first network device comprises an unassociated client module.

40. The first network device of claim 39, wherein, when the configuration indicates that the first network device comprises the access point module, the communication unit is configured to:
  execute the connection establishment procedures to identify the second network device with which to establish the communication link, wherein the second network device is an unassociated client device attempting to join the communication network, and
  transmit an activation event message including access point module information.

41. The first network device of claim 39, wherein, when the configuration indicates that the first network device comprises the access point module and when the first network device is associated with a first device category, the communication unit is further configured to:
  determine that the access point module of the first network device is configured as a designated access point of the communication network;
  execute the connection establishment procedures to,
    identify the second network device attempting to join the communication network, and
    establish the communication link; and
  transmit a notification message via the communication network to indicate that the first network device is the designated access point and that the first network device is executing the connection establishment procedures to establish the communication link.

42. The first network device of claim 39, wherein, when the configuration indicates that the first network device comprises the access point module, the communication unit is configured to:
  determine whether an access point selector of the communication network can be identified within a time interval;
  in response to identifying the access point selector within the time interval, transmit an activation event message without access point module information.

43. The first network device of claim 39, wherein the communication unit is further configured to:
  receive, from a third network device of the communication network, an activation event message without client module information and without an access point module information associated with the third network device;
  determine that the access point module of the first network device is configured as a designated access point of the communication network; and
  determine whether an access point selector can be identified within a time interval, in response to determining that the access point module is configured as the designated access point and in response to receiving the activation event message from the third network device.

44. A non-transitory machine-readable storage media having machine executable instructions stored therein, the machine executable instructions comprising instructions that, when executed by a processor of an access point selector, cause the access point selector to:
  receive, at the access point selector of a communication network, a first notification from one of a plurality of access points in the communication network for establishing a communication link with a client device, wherein the plurality of access points comprise the access point selector;
  determine that a first trigger associated with the client device and a second trigger associated with a network device of the communication network are each activated within a first time interval;
  determining, during a second time interval, whether the communication network comprises a designated access point;
  in response to determining that the communication network does not comprise the designated access point,
    determine that a first access point of the plurality of access points should establish the communication link based, at least in part, on the first notification and on determining that the first trigger and the second trigger are each activated within the first time interval; and
    notify the first access point to establish the communication link; and
  in response to determining that the communication network comprises the designated access point, abort operations for determining which of the plurality of access points should establish the communication link with the client device.

45. A non-transitory machine-readable storage media having machine executable instructions stored therein, the machine executable instructions comprising instructions that, when executed by a processor of a first network device, cause the first network device to:
  determine that a trigger associated with the first network device of a communication network is activated for establishing a communication link with a second network device of the communication network;
  determine a device category associated with the first network device and a configuration of the first network device; and initiate connection establishment procedures to establish the communication link with the second network device based, at least in part, on the device category associated with the first network device and the configuration of the first network device, wherein the configuration of the first network device indicates whether the first network device comprises an access point module and whether the first network device comprises an unassociated client module.

46. The non-transitory machine-readable storage media of claim 45, wherein the instructions, when executed by the processor of the first network device, cause the first network device to,
when the configuration indicates that the first network device comprises the access point module,
execute the connection establishment procedures to identify the second network device with which to establish the communication link, wherein the second network device is an unassociated client device attempting to join the communication network, and
transmit an activation event message including access point module information.

47. The non-transitory machine-readable storage media of claim 45, wherein the instructions, when executed by the processor of the first network device, cause the first network device to,
when the configuration indicates that the first network device comprises the access point module,
determine whether an access point selector of the communication network can be identified within a time interval;
in response to identifying the access point selector within the time interval, transmit an activation event message without access point module information.

48. The method of claim 24, wherein,
when the configuration indicates that the first network device comprises the unassociated client module and when the first network device is associated with a first device category,
executing the connection establishment procedures to identify the second network device with which to establish the communication link, wherein the second network device is an access point of the communication network, and
transmitting an activation event message including client module information.

49. The method of claim 33, wherein, when the configuration indicates that the first network device comprises the access point module,
when the access point selector cannot be identified within the time interval,
executing the connection establishment procedures to identify the second network device with which to establish the communication link,
wherein the second network device is an unassociated client device attempting to join the communication network; and
transmitting the activation event message including the access point module information on the communication network.

* * * * *